(12) United States Patent
Sharma et al.

(10) Patent No.: US 9,009,427 B2
(45) Date of Patent: Apr. 14, 2015

(54) MIRRORING MECHANISMS FOR STORAGE AREA NETWORKS AND NETWORK BASED VIRTUALIZATION

(75) Inventors: Samar Sharma, San Jose, CA (US);
Silvano Gai, San Jose, CA (US); Dinesh Dutt, Sunnyvale, CA (US); Sanjaya Kumar, Fremont, CA (US); Umesh Mahajan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1006 days.

(21) Appl. No.: 12/364,416

(22) Filed: Feb. 2, 2009

(65) Prior Publication Data

US 2009/0228651 A1    Sep. 10, 2009

Related U.S. Application Data

(63) Continuation-in-part of application No. 11/256,450, filed on Oct. 21, 2005, now abandoned, and a continuation-in-part of application No. 11/256,292, filed on Oct. 21, 2005, now abandoned, and a (Continued)

(51) Int. Cl.
*G06F 12/00* (2006.01)
*G06F 11/20* (2006.01)

(52) U.S. Cl.
CPC ........ *G06F 11/2069* (2013.01); *G06F 11/2064* (2013.01); *G06F 11/2082* (2013.01); *G06F 11/2087* (2013.01); *G06F 2201/84* (2013.01)

(58) Field of Classification Search
CPC . G06F 12/00; G06F 11/1446; G06F 11/1448; G06F 11/1451; G06F 11/1458; G06F 11/1461; G06F 11/1464

USPC .......... 711/100, 111, 112, 154, 162
See application file for complete search history.

(56) References Cited

U.S. PATENT DOCUMENTS

| 5,367,690 | A | 11/1994 | Schiffleger |
| 5,875,456 | A | 2/1999 | Stallmo et al. |
| 6,173,377 | B1 | 1/2001 | Yanai et al. |
| 6,185,203 | B1 * | 2/2001 | Berman ........................ 370/351 |

(Continued)

FOREIGN PATENT DOCUMENTS

WO    2007/064417    6/2007

OTHER PUBLICATIONS

Office Action dated Oct. 9, 2007 for U.S. Appl. No. 11/256,292.

(Continued)

*Primary Examiner* — Tuan Thai
(74) *Attorney, Agent, or Firm* — Novak Druce Connolly Bove + Quigg LLP

(57) ABSTRACT

A technique is provided for implementing online mirroring of a volume in a storage area network. A first instance of the volume is instantiated at a first port of the fiber channel fabric for enabling I/O operations to be performed at the volume. One or more mirroring procedures may be performed at the volume. In at least one implementation, the first port is able to perform first I/O operations at the volume concurrently while the mirroring procedures are being performed at the first volume. In one implementation, the mirroring procedures may be implemented at a fabric switch of the storage area network. Additionally, in at least one implementation, multiple hosts may be provided with concurrent access to the volume during the mirroring operations without serializing the access to the volume.

33 Claims, 19 Drawing Sheets

Related U.S. Application Data continuation-in-part of application No. 11/256,030, filed on Oct. 21, 2005, now abandoned, and a continuation-in-part of application No. 10/034,160, filed on Dec. 26, 2001, now Pat. No. 7,599,360, and a continuation-in-part of application No. 12/199,678, filed on Aug. 27, 2008, now Pat. No. 8,725,854, which is a continuation of application No. 10/056,238, filed on Jan. 23, 2002, now Pat. No. 7,433,948, application No. 12/364,416, which is a continuation-in-part of application No. 10/045,883, filed on Jan. 9, 2002, now Pat. No. 7,548,975.

(56) References Cited

U.S. PATENT DOCUMENTS

| | | |
|---|---|---|
| 6,219,753 B1 | 4/2001 | Richardson |
| 6,324,654 B1 | 11/2001 | Wahl et al. |
| 6,442,706 B1 | 8/2002 | Wahl et al. |
| 6,480,970 B1 | 11/2002 | DeKoning et al. |
| 6,553,390 B1 | 4/2003 | Gross et al. |
| 6,618,818 B1 | 9/2003 | Wahl et al. |
| 6,647,474 B2 | 11/2003 | Yanai et al. |
| 6,665,812 B1 | 12/2003 | Blumenau et al. |
| 6,694,413 B1 | 2/2004 | Mimatsu et al. |
| 6,708,227 B1 | 3/2004 | Cabrera et al. |
| 6,799,258 B1 | 9/2004 | Linde |
| 6,820,099 B1 | 11/2004 | Huber et al. |
| 6,883,083 B1 | 4/2005 | Kemkar |
| 6,948,044 B1 | 9/2005 | Chandrasekaran et al. |
| 7,069,465 B2* | 6/2006 | Chu et al. ............... 714/6.22 |
| 7,149,787 B1 | 12/2006 | Mutalik et al. |
| 7,149,858 B1* | 12/2006 | Kiselev ............... 711/162 |
| 7,171,514 B2* | 1/2007 | Coronado et al. ............ 711/112 |
| 7,191,299 B1 | 3/2007 | Kekre et al. |
| 7,203,732 B2 | 4/2007 | McCabe et al. |
| 7,383,381 B1* | 6/2008 | Faulkner et al. ............... 711/114 |
| 7,386,664 B1 | 6/2008 | Roy et al. |
| 7,389,394 B1 | 6/2008 | Karr et al. |
| 7,415,488 B1 | 8/2008 | Muth et al. |
| 7,424,637 B1 | 9/2008 | Schoenthal et al. |
| 7,877,545 B2 | 1/2011 | Sharma |
| 2001/0037371 A1 | 11/2001 | Ohran |
| 2002/0016827 A1 | 2/2002 | McCabe et al. |
| 2002/0019908 A1 | 2/2002 | Reuter et al. |
| 2002/0191649 A1 | 12/2002 | Woodring |
| 2003/0093567 A1 | 5/2003 | Lolayekar et al. |
| 2003/0131182 A1 | 7/2003 | Kumar et al. |
| 2003/0135642 A1 | 7/2003 | Benedetto et al. |
| 2003/0149695 A1 | 8/2003 | Delaire et al. |
| 2003/0172149 A1 | 9/2003 | Edsall et al. |
| 2003/0172316 A1 | 9/2003 | Tremblay et al. |
| 2003/0177176 A1 | 9/2003 | Hirschfeld et al. |
| 2003/0182503 A1 | 9/2003 | Leong et al. |
| 2003/0188114 A1 | 10/2003 | Lubbers et al. |
| 2003/0236945 A1 | 12/2003 | Nahum |
| 2004/0024854 A1 | 2/2004 | Mandal |
| 2004/0024961 A1 | 2/2004 | Cochran et al. |
| 2004/0120225 A1 | 6/2004 | Dalal et al. |
| 2004/0153606 A1 | 8/2004 | Schott |
| 2004/0186970 A1 | 9/2004 | Kekre et al. |
| 2004/0233910 A1 | 11/2004 | Chen et al. |
| 2004/0250034 A1 | 12/2004 | Yagawa et al. |
| 2005/0050273 A1 | 3/2005 | Horn et al. |
| 2005/0071710 A1 | 3/2005 | Micka et al. |
| 2005/0076113 A1 | 4/2005 | Klotz et al. |
| 2005/0114464 A1 | 5/2005 | Amir et al. |
| 2005/0149683 A1 | 7/2005 | Chong et al. |
| 2005/0177693 A1 | 8/2005 | Nahum |
| 2005/0246489 A1 | 11/2005 | Cochran et al. |
| 2006/0080416 A1 | 4/2006 | Gandhi |
| 2006/0248379 A1 | 11/2006 | Jernigan |
| 2007/0094464 A1 | 4/2007 | Sharma |
| 2007/0094465 A1 | 4/2007 | Sharma |
| 2007/0094466 A1 | 4/2007 | Sharma |
| 2009/0259816 A1 | 10/2009 | Sharma |
| 2009/0259817 A1 | 10/2009 | Sharma |

OTHER PUBLICATIONS

Final Office Action dated Apr. 4, 2008 for U.S. Appl. No. 11/256,292.
Office Action dated Sep. 28, 2007 for U.S. Appl. No. 11/256,450.
Office Action dated Apr. 3, 2008 for U.S. Appl. No. 11/256,450.
Office Action dated Oct. 10, 2008 for U.S. Appl. No. 11/256,030.
Final Office Action dated Apr. 29, 2008 for U.S. Appl. No. 11/256,030.
International Search Report dated Feb. 6, 2008 for PCT Application No. PCT/US06/40599.
Final Office Action dated Oct. 23, 2008 for U.S. Appl. No. 11/256,450.
Office Action dated Apr. 28, 2011 for U.S. Appl. No. 12/365,076.
Final Office Action dated Oct. 4, 2011 for U.S. Appl. No. 12/365,076.
Office Action dated Oct. 1, 2008 for U.S. Appl. No. 11/256,292.
Office Action dated Oct. 9, 2007 for U.S. Appl. No. 11/256,030.
Office Action dated Apr. 28, 2011 for U.S. Appl. No. 12/365,079.
Final Office Action dated Oct. 5, 2011 for U.S. Appl. No. 12/365,079.
Crossroads, (White Paper) "The Case for Storage Virtualization Using Intelligent Routers"; Feb. 2001, p. 13.
Lawrence et al. "Three Challenges in the Implementation of Disk Monitoring"; IBM Technical Disclosure Bulletin; vol. 33, No. 4, Sep. 1990, pp. 14-20.
EP patent application No. 06826135, Supplementary European Search Report mailed Oct. 26, 2012.
U.S. Appl. No. 12/365,076, Office Action mailed Sep. 16, 2013.
Sosinsky, Barrie, "The business value of virtual volume Management in Microsoft windows NT and windows 2000 networks—a white paper for administrators and planners," Veritas, Oct. 2001.
Milligan, Charles et al., "Online storage virtualization: the key to managing the data explosion," Proceedings of the 35$^{th}$ Hawaii International conference on system sciences, 2002.

* cited by examiner

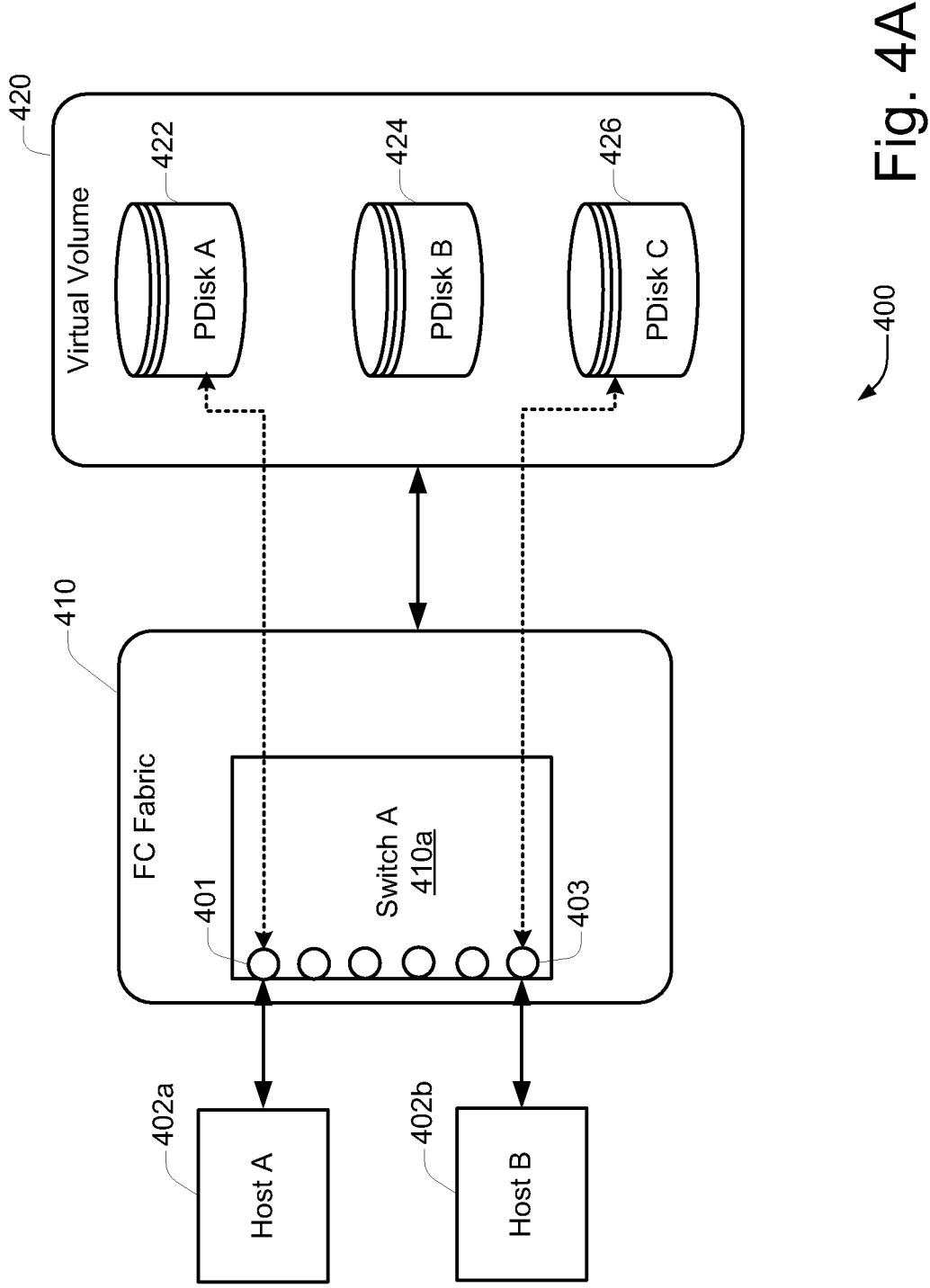

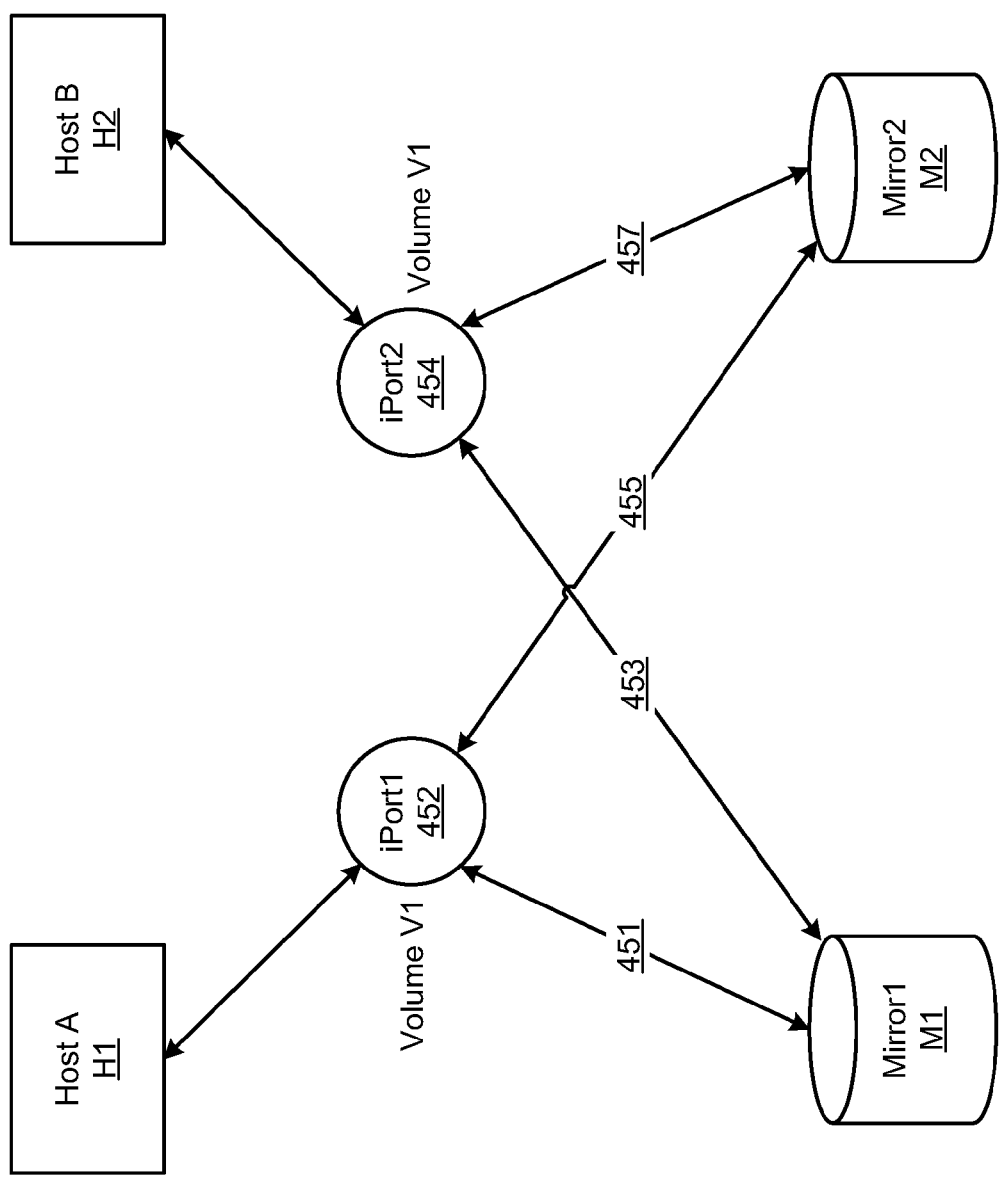

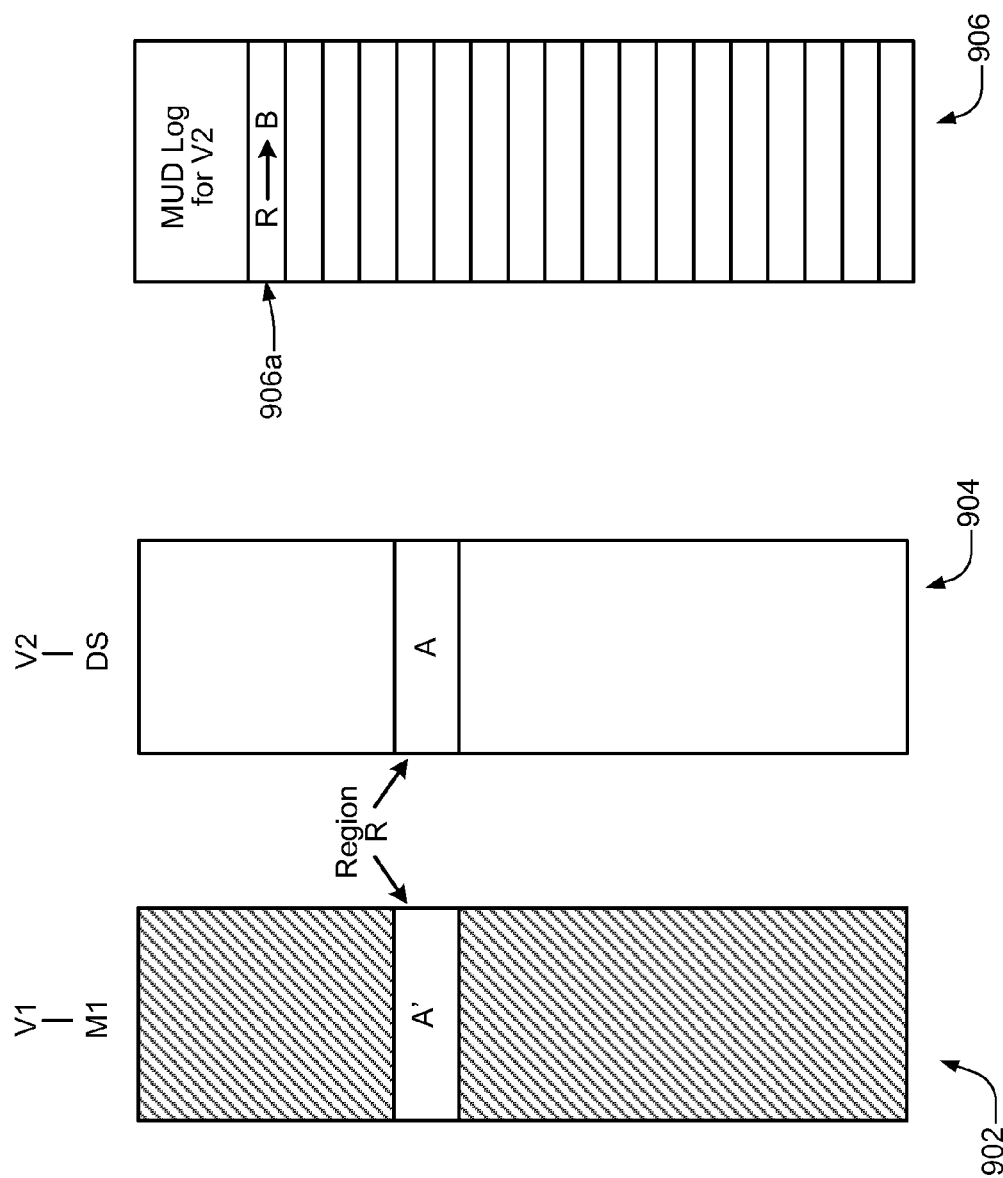

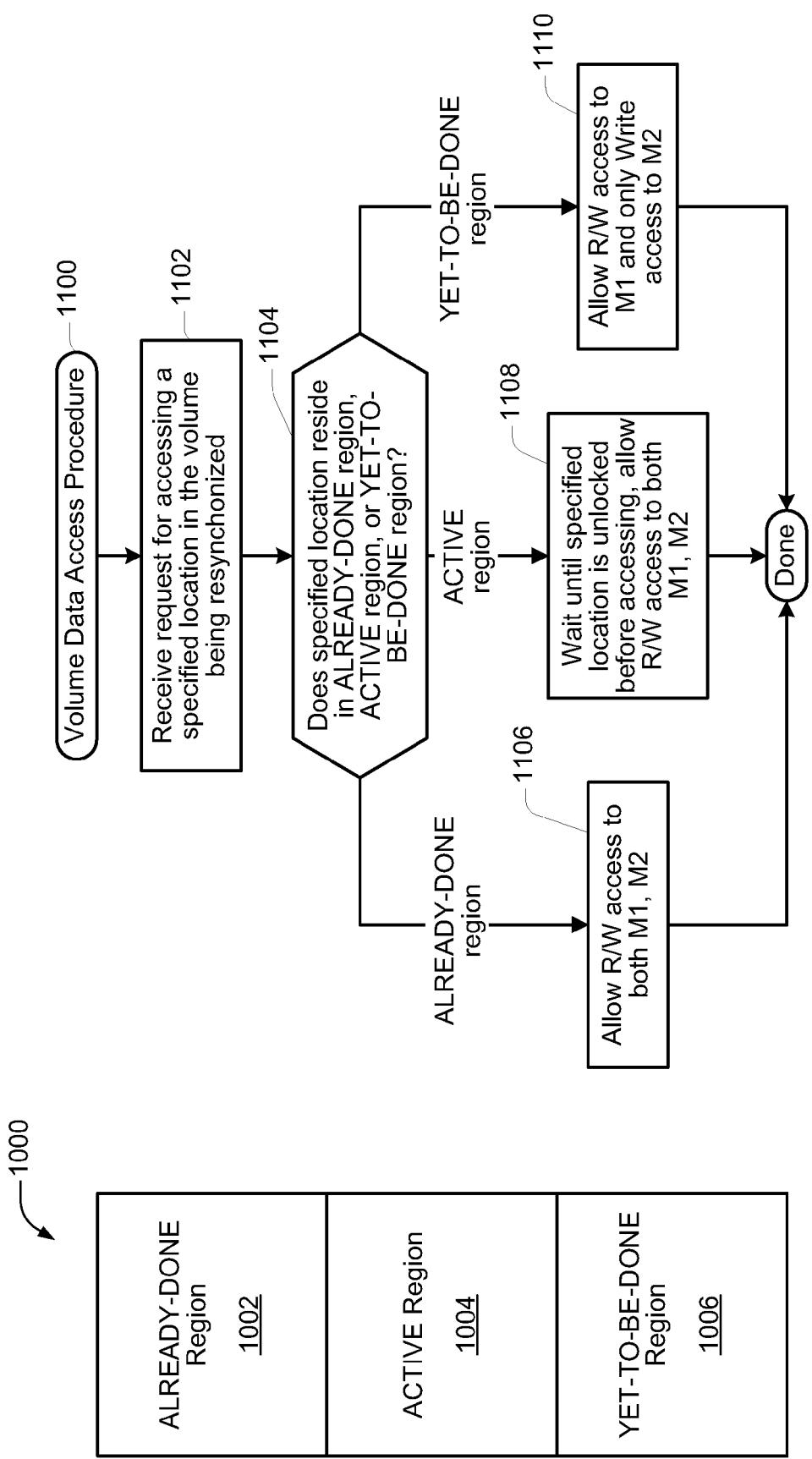

MIRRORING MECHANISMS FOR STORAGE AREA NETWORKS AND NETWORK BASED VIRTUALIZATION

RELATED APPLICATION DATA

This application is a continuation-in-part application, pursuant to the provisions of 35 U.S.C. §120, of prior U.S. patent application Ser. No. 11/256,450, published as U.S. Publication No. US-2007-0094466), titled "TECHNIQUES FOR IMPROVING MIRRORING OPERATIONS IMPLEMENTED IN STORAGE AREA NETWORKS AND NETWORK BASED VIRTUALIZATION" by Sharma et al., filed on Oct. 21, 2005, the entirety of which is incorporated herein by reference for all purposes.

This application is a continuation-in-part application, pursuant to the provisions of 35 U.S.C. §120, of prior U.S. patent application Ser. No. 11/256,292, published as U.S. Publication No. US-2007-0094465), titled "IMPROVED MIRRORING MECHANISMS FOR STORAGE AREA NETWORKS AND NETWORK BASED VIRTUALIZATION" by Sharma et al., filed on Oct. 21, 2005, the entirety of which is incorporated herein by reference for all purposes.

This application is a continuation-in-part application, pursuant to the provisions of 35 U.S.C. §120, of prior U.S. patent application Ser. No. 11/256,030, published as U.S. Publication No. US-2007-0094464), titled "IMPROVED MIRROR CONSISTENCY CHECKING TECHNIQUES FOR STORAGE AREA NETWORKS AND NETWORK BASED VIRTUALIZATION", by Sharma et al., filed on Oct. 21, 2005, the entirety of which is incorporated herein by reference for all purposes.

This application is a continuation-in-part application, pursuant to the provisions of 35 U.S.C. §120, of prior U.S. patent application Ser. No. 10/034,160, published as U.S. Publication No. US-2007-0094464), titled "METHODS AND APPARATUS FOR ENCAPSULATING A FRAME FOR TRANSMISSION IN A STORAGE AREA NETWORK", by Edsall et al., filed on Dec. 26, 2001, the entirety of which is incorporated herein by reference for all purposes.

This application is a continuation-in-part application, pursuant to the provisions of 35 U.S.C. §120, of prior U.S. patent application Ser. No. 12/199,678, published as U.S. Publication No. US-2008-0320134), titled "METHODS AND APPARATUS FOR IMPLEMENTING VIRTUALIZATION OF STORAGE WITHIN A STORAGE AREA NETWORK", by Edsall et al., filed on Aug. 27, 2008, which is a continuation application of U.S. patent application Ser. No. 10/056,238, issued as U.S. Pat. No. 7,433,948), titled "Methods and Apparatus for Implementing Virtualization of Storage within a Storage Area Network", filed on Jan. 23, 2002, by Edsall et al. Each of these applications is incorporated herein by reference in it's entirety and for all purposes.

This application is a continuation-in-part application, pursuant to the provisions of 35 U.S.C. §120, of prior U.S. patent application Ser. No. 10/045,883, published as U.S. Publication No. US-2003-0131182), titled "METHODS AND APPARATUS FOR IMPLEMENTING VIRTUALIZATION OF STORAGE WITHIN A STORAGE AREA NETWORK THROUGH A VIRTUAL ENCLOSURE", by Kumar et al., filed on Jan. 9, 2002, the entirety of which is incorporated herein by reference for all purposes.

BACKGROUND

1. Field

The present invention relates to network technology. More particularly, the present invention relates to methods and apparatus for improved mirroring techniques implemented in storage area networks and network based virtualization.

2. Description of the Related Art

In recent years, the capacity of storage devices has not increased as fast as the demand for storage. Therefore a given server or other host must access multiple, physically distinct storage nodes (typically disks). In order to solve these storage limitations, the storage area network (SAN) was developed. Generally, a storage area network is a high-speed special-purpose network that interconnects different data storage devices and associated data hosts on behalf of a larger network of users. However, although a SAN enables a storage device to be configured for use by various network devices and/or entities within a network, data storage needs are often dynamic rather than static.

FIG. 1 illustrates an exemplary conventional storage area network. More specifically, within a storage area network 102, it is possible to couple a set of hosts (e.g., servers or workstations) 104, 106, 108 to a pool of storage devices (e.g., disks). In SCSI parlance, the hosts may be viewed as "initiators" and the storage devices may be viewed as "targets." A storage pool may be implemented, for example, through a set of storage arrays or disk arrays 110, 112, 114. Each disk array 110, 112, 114 further corresponds to a set of disks. In this example, first disk array 110 corresponds to disks 116, 118, second disk array 112 corresponds to disk 120, and third disk array 114 corresponds to disks 122, 124. Rather than enabling all hosts 104-108 to access all disks 116-124, it is desirable to enable the dynamic and invisible allocation of storage (e.g., disks) to each of the hosts 104-108 via the disk arrays 110, 112, 114. In other words, physical memory (e.g., physical disks) may be allocated through the concept of virtual memory (e.g., virtual disks). This allows one to connect heterogeneous initiators to a distributed, heterogeneous set of targets (storage pool) in a manner enabling the dynamic and transparent allocation of storage.

The concept of virtual memory has traditionally been used to enable physical memory to be virtualized through the translation between physical addresses in physical memory and virtual addresses in virtual memory. Recently, the concept of "virtualization" has been implemented in storage area networks through various mechanisms. Virtualization interconverts physical storage and virtual storage on a storage network. The hosts (initiators) see virtual disks as targets. The virtual disks represent available physical storage in a defined but somewhat flexible manner. Virtualization provides hosts with a representation of available physical storage that is not constrained by certain physical arrangements/allocation of the storage. Some aspects of virtualization have recently been achieved through implementing the virtualization function in various locations within the storage area network. Three such locations have gained some level of acceptance: virtualization in the hosts (e.g., 104-108), virtualization in the disk arrays or storage arrays (e.g., 110-114), and virtualization in the network fabric (e.g., 102).

In some general ways, virtualization on a storage area network is similar to virtual memory on a typical computer system. Virtualization on a network, however, brings far greater complexity and far greater flexibility. The complexity arises directly from the fact that there are a number of separately interconnected network nodes. Virtualization must span these nodes. The nodes include hosts, storage subsystems, and switches (or comparable network traffic control devices such as routers). Often the hosts and/or storage subsystems are heterogeneous, being provided by different vendors. The vendors may employ distinctly different protocols (standard protocols or proprietary protocols). Thus, in many cases, virtualization provides the ability to connect heterogeneous initiators (e.g., hosts or servers) to a distributed, heterogeneous set of targets (storage subsystems), enabling the dynamic and transparent allocation of storage.

Examples of network specific virtualization operations include the following: RAID 0 through RAID 5, concatenation of memory from two or more distinct logical units of physical memory, sparing (auto-replacement of failed physical media), remote mirroring of physical memory, logging information (e.g., errors and/or statistics), load balancing among multiple physical memory systems, striping (e.g., RAID 0), security measures such as access control algorithms for accessing physical memory, resizing of virtual memory blocks, Logical Unit (LUN) mapping to allow arbitrary LUNs to serve as boot devices, backup of physical memory (point in time copying), and the like. These are merely examples of virtualization functions.

Some features of virtualization may be implemented using a Redundant Array of Independent Disks (RAID). Various RAID subtypes are generally known to one having ordinary skill in the art, and include, for example, RAID0, RAID1, RAID0+1, RAID5, etc. In RAID1, typically referred to as "mirroring", a virtual disk may correspond to two physical disks 116, 118 which both store the same data (or otherwise support recovery of the same data), thereby enabling redundancy to be supported within a storage area network. In RAID0, typically referred to as "striping", a single virtual disk is striped across multiple physical disks. Some other types of virtualization include concatenation, sparing, etc.

Generally, a mirrored configuration is when a volume is made of n copies of user data. In this configuration, the redundancy level is n-1. Conventionally, the mirroring functionality is implemented at either the host or the storage array. According to conventional techniques, when it is desired to create a mirror of a selected volume, the following steps may be performed. First, the target volume (i.e. volume to be mirrored) is taken offline so that the data stored in the target volume remains consistent during the mirror creation process. Second, the required disk space for implementing the mirror is determined and allocated. Thereafter, the entirety of the data of the target volume is copied over to the newly allocated mirror in order to create an identical copy of the target volume. Once the copying has been completed, the target volume and its mirror may then be brought online.

A similar process occurs when synchronizing a mirror to a selected target volume using conventional techniques. For example, the target volume (i.e. volume to be synchronized to) is initially taken offline. Thereafter, the entirety of the data of the target volume may be copied over to the mirror in order to ensure synchronization between the target volume and the mirror. Once the copying has been completed, the target volume and its mirror may then be brought online.

One problem associated with conventional mirroring techniques such as those described above relates to the length of time needed to successfully complete a mirroring operation. For example, in situations where the target volume includes terabytes of data, the process of creating or synchronizing a mirror with the target volume may take several days to complete, during which time the target volume may remain off line. Other issues involving conventional mirroring techniques may include one or more of the following: access to a mirrored volume may need to be serialized through a common network device which is in charge of managing the mirrored volume; access to the mirrored volume may be unavailable during mirroring operations; mirroring architecture has limited scalability; etc.

In view of the above, it would be desirable to improve upon mirroring techniques implemented in storage area networks and network based virtualization in order, for example, to provide for improved network reliability and efficient utilization of network resources.

SUMMARY

Various aspects of the present invention are directed to different methods, systems, and computer program products for facilitating information management in a storage area network. In one implementation, the storage area network utilizes a fibre channel fabric which includes a plurality of ports. A first instance of a first volume is instantiated at a first port of the fibre channel fabric. The first port is adapted to enable I/O operations to be performed at the first volume. A first mirroring procedure is performed at the first volume. According to a specific embodiment, the first port is able to perform first I/O operations at the first volume concurrently while the first mirroring procedure is being performed at the first volume.

According to a specific embodiment, a second instance of the first volume may be instantiated at a second port of the fibre channel fabric. The second port is adapted to enable I/O operations to be performed at the first volume. The second port may perform second I/O operations at the first volume concurrently while the first mirroring procedure is being performed at the first volume, and concurrently while the first port is performing the first I/O operations at the first volume. In one implementation, the first I/O operations are performed independently of the second I/O operations.

According to different embodiments, the first mirroring procedure may include one or more mirroring operations such as, for example: creating a mirror copy of a designated volume; completing a mirror copy; detaching a mirror copy from a designated volume; re-attaching a mirror to a designated volume; creating a differential snapshot of a designated volume; creating an addressable mirror of a designated volume; performing mirror resynchronization operations for a designated volume; performing mirror consistency checks; deleting a mirror; etc. Additionally, and at least one embodiment, the first and/or second volumes may be instantiated at one or more switches of the fibre channel fabric. Further, at least some of the mirroring operations may be implemented at one or more switches of the fibre channel fabric.

For example, in one implementation, the first volume may include a first mirror, and the storage area network may includes a second mirror containing data which is inconsistent with the data of the first mirror. The first mirroring procedure may include performing a mirror resync operation for resynchronizing the second mirror to the first mirror to thereby cause the second data is consistent with the first data. In at least one implementation, host I/O operations may be performed at the first and/or second mirror concurrently while the mirror resynchronizing is being performed.

In other implementations, the storage area network utilizes a fibre channel fabric which includes a plurality of ports. A first instance of a first volume is instantiated at a first port of the fibre channel fabric. The first port is adapted to enable I/O operations to be performed at the first volume. A first mirroring procedure is performed at the first volume. In one implementation, the first mirroring procedure may include creating a differential snapshot of the first volume, wherein the differential snapshot is representative of a copy of the first volume as of a designated time T. According to a specific embodiment, the first port is able to perform first I/O operations at the first volume concurrently while the first mirroring procedure is being performed. Additionally, in at least one implementation, the differential snapshot may be created concurrently while the first volume is online and accessible by at least one host. Further, I/O access to the first volume and/or differential snapshot may be concurrently provided to multiple hosts without serializing such access. In at least one implementation, the differential snapshot may be instantiated a switch of the fibre channel fabric.

In other implementations, the storage area network utilizes a fibre channel fabric which includes a plurality of ports. A first instance of a first volume is instantiated at a first port of the fibre channel fabric. The first port is adapted to enable I/O operations to be performed at the first volume. A first mirroring procedure is performed at the first volume. In one implementation, the first mirroring procedure may include creating a mirror of the first volume, wherein the mirror is implemented as a mirror copy of the first volume as of a designated time T. According to a specific embodiment, the first port is able to perform first I/O operations at the first volume concurrently while the first mirroring procedure is being performed. In at least one implementation, the mirror may be instantiated as a separately addressable second volume. Additionally, in at least one implementation, the mirror may be created concurrently while the first volume is online and accessible by at least one host. Further, I/O access to the first volume and/or mirror may be concurrently provided to multiple hosts without serializing such access. In at least one implementation, the mirror may be instantiated a switch of the fibre channel fabric.

Another aspect of the present is directed to different methods, systems, and computer program products for facilitating information management in a storage area network. The storage area network may utilize a fibre channel fabric which includes a plurality of ports. The storage area network may also comprise a first volume which includes a first mirror copy and a second mirror copy. The storage area network may further comprise a mirror consistency data structure adapted to store mirror consistency information. A first instance of a first volume is instantiated at a first port of the fibre channel fabric. A first write request for writing a first portion of data to a first region of the first volume is received. In response, a first write operation may be initiated for writing the first portion of data to the first region of the first mirror copy. Additionally, a second write operation may also be initiated for writing the first portion of data to the first region of the second mirror copy. Information in the mirror consistency data structure may be updated to indicate a possibility of inconsistent data at the first region of the first and second mirror copies. According to a specific embodiment, information in the mirror consistency data structure may be updated to indicate a consistency of data at the first region of the first and second mirror copies in response to determining a successful completion of the first write operation at the first region of the first volume, and a successful completion of the second write operation at the first region of the second volume. In at least one implementation, at least some of the mirror consistency checking operations may be implemented at a switch of the fibre channel fabric.

Another aspect of the present is directed to different methods, systems, and computer program products for facilitating information management in a storage area network. The storage area network may utilize a fibre channel fabric which includes a plurality of ports. The storage area network may also comprise a first volume which includes a first mirror copy and a second mirror copy. The storage area network may further comprise a mirror consistency data structure adapted to store mirror consistency information. A mirror consistency check procedure is performed to determine whether data of the first mirror copy is consistent with data of the second mirror copy. According to one implementation, the mirror consistency check procedure may be implemented using the consistency information stored at the mirror consistency data structure.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 4A shows a block diagram of a network portion 400 illustrating a specific embodiment of how virtualization may be implemented in a storage area network.

FIG. 4B shows an example of storage area network portion 450, which may be used for illustrating various concepts relating to the technique of the present invention.

FIG. 9 shows a block diagram of various data structures which may be used for implementing a specific embodiment of the iMirror technique of the present invention.

FIG. 10 shows a block diagram of a representation of a volume (or mirror) 1000 during mirroring operations (such as, for example, mirror resync operations) in accordance with a specific embodiment of the present invention.

FIG. 11 shows a flow diagram of a Volume Data Access Procedure 1100 in accordance with a specific embodiment of the present invention.

DETAILED DESCRIPTION OF EXAMPLE EMBODIMENTS

Figure 1:
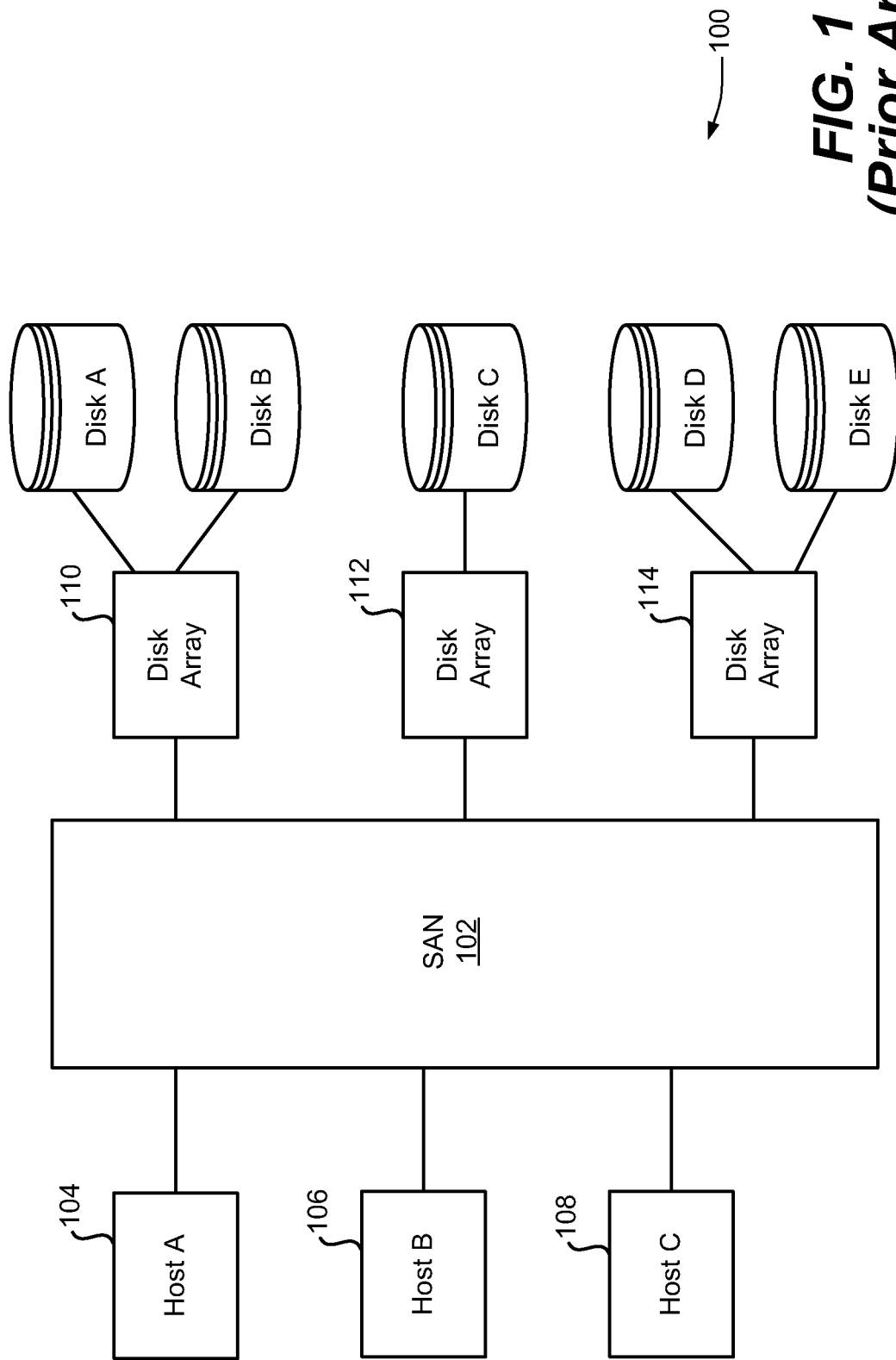
FIG. 1 illustrates an exemplary conventional storage area network.

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

In accordance with various embodiments of the present invention, virtualization of storage within a storage area network may be implemented through the creation of a virtual enclosure having one or more virtual enclosure ports. The virtual enclosure is implemented, in part, by one or more network devices, which will be referred to herein as virtualization switches. More specifically, a virtualization switch, or more specifically, a virtualization port within the virtualization switch, may handle messages such as packets or frames on behalf of one of the virtual enclosure ports. Thus, embodiments of the invention may be applied to a packet or frame directed to a virtual enclosure port, as will be described in further detail below. For convenience, the subsequent discussion will describe embodiments of the invention with respect to frames. Switches act on frames and use information about SANs to make switching decisions.

Note that the frames being received and transmitted by a virtualization switch possess the frame format specified for a standard protocol such as Ethernet or fibre channel. Hence, software and hardware conventionally used to generate such frames may be employed with this invention. Additional hardware and/or software is employed to modify and/or generate frames compatible with the standard protocol in accordance with this invention. Those of skill in the art will understand how to develop the necessary hardware and software to allow virtualization as described below.

Obviously, the appropriate network devices should be configured with the appropriate software and/or hardware for performing virtualization functionality. Of course, all network devices within the storage area network need not be configured with the virtualization functionality. Rather, selected switches and/or ports may be configured with or adapted for virtualization functionality. Similarly, in various embodiments, such virtualization functionality may be enabled or disabled through the selection of various modes. Moreover, it may be desirable to configure selected ports of network devices as virtualization-capable ports capable of performing virtualization, either continuously, or only when in a virtualization enabled state.

The standard protocol employed in the storage area network (i.e., the protocol used to frame the data) will typically, although not necessarily, be synonymous with the "type of traffic" carried by the network. As explained below, the type of traffic is defined in some encapsulation formats. Examples of the type of traffic are typically layer 2 or corresponding layer formats such as Ethernet, Fibre channel, and InfiniBand.

As described above, a storage area network (SAN) is a high-speed special-purpose network that interconnects different data storage devices with associated network hosts (e.g., data servers or end user machines) on behalf of a larger network of users. A SAN is defined by the physical configuration of the system. In other words, those devices in a SAN must be physically interconnected.

It will be appreciated that various aspects of the present invention pertain to virtualized storage networks. Unlike prior methods in which virtualization is implemented at the hosts or disk arrays, virtualization in this invention is implemented through the creation and implementation of a virtual enclosure. This is accomplished, in part, through the use of switches or other "interior" network nodes of a storage area network to implement the virtual enclosure. Further, the virtualization of this invention typically is implemented on a per port basis. In other words, a multi-port virtualization switch will have virtualization separately implemented on one or more of its ports. Individual ports have dedicated logic for handing the virtualization functions for packets or frames handled by the individual ports, which may be referred to as "intelligent" ports or simply "iPorts." This allows virtualization processing to scale with the number of ports, and provides far greater bandwidth for virtualization than can be provided with host based or storage based virtualization schemes. In such prior art approaches the number of connections between hosts and the network fabric or between storage nodes and the network fabric are limited—at least in comparison to the number of ports in the network fabric.

Virtualization may take many forms. In general, it may be defined as logic or procedures that inter-relate physical storage and virtual storage on a storage network. Hosts see a representation of available physical storage that is not constrained by the physical arrangements or allocations inherent in that storage. One example of a physical constraint that is transcended by virtualization includes the size and location of constituent physical storage blocks. For example, logical units as defined by the Small Computer System Interface (SCSI) standards come in precise physical sizes (e.g., 36 GB and 72 GB). Virtualization can represent storage in virtual logical units that are smaller or larger than the defined size of a physical logical unit. Further, virtualization can present a virtual logical unit comprised of regions from two or more different physical logical units, sometimes provided on devices from different vendors. Preferably, the virtualization operations are transparent to at least some network entities (e.g., hosts).

In some of the discussion herein, the functions of virtualization switches of this invention are described in terms of the SCSI protocol. This is because many storage area networks in commerce run a SCSI protocol to access storage sites. Frequently, the storage area network employs fibre channel (e.g., FC-PH (ANSI X3.230-1994, Fibre channel-Physical and Signaling Interface)) as a lower level protocol and runs IP and SCSI on top of fibre channel. Note that the invention is not limited to any of these protocols. For example, fibre channel may be replaced with Ethernet, Infiniband, and the like. Further the higher level protocols need not include SCSI. For example, this may include SCSI over FC, iSCSI (SCSI over IP), parallel SCSI (SCSI over a parallel cable), serial SCSI (SCSI over serial cable, and all the other incarnations of SCSI.

Because SCSI is so widely used in storage area networks, much of the terminology used herein will be SCSI terminology. The use of SCSI terminology (e.g., "initiator" and "target") does not imply that the describe procedure or apparatus must employ SCSI. Before going further, it is worth explaining a few of the SCSI terms that will be used in this discussion. First an "initiator" is a device (usually a host system) that requests an operation to be performed by another device. Typically, in the context of this document, a host initiator will request a read or write operation be performed on a region of virtual or physical memory. Next, a "target" is a device that performs an operation requested by an initiator. For example, a target physical memory disk will obtain or write data as initially requested by a host initiator. Note that while the host initiator may provide instructions to read from or write to a "virtual" target having a virtual address, a virtualization switch of this invention must first convert those instructions to a physical target address before instructing the target.

Targets may be divided into physical or virtual "logical units." These are specific devices addressable through the target. For example, a physical storage subsystem may be organized in a number of distinct logical units. In this document, hosts view virtual memory as distinct virtual logical units. Sometimes herein, logical units will be referred to as "LUNs." In the SCSI standard, LUN refers to a logical unit number. But in common parlance, LUN also refers to the logical unit itself.

Central to virtualization is the concept of a "virtualization model." This is the way in which physical storage provided on storage subsystems (such as disk arrays) is related to a virtual storage seen by hosts or other initiators on a network. While the relationship may take many forms and be characterized by various terms, a SCSI-based terminology will be used, as indicated above. Thus, the physical side of the storage area network will be described as a physical LUN. The host side, in turn, sees one or more virtual LUNs, which are virtual representations of the physical LUNs. The mapping of physical LUNs to virtual LUNs may logically take place over one, two, or more levels. In the end, there is a mapping function that can be used by switches of this invention to interconvert between physical LUN addresses and virtual LUN addresses.

Figure 2:
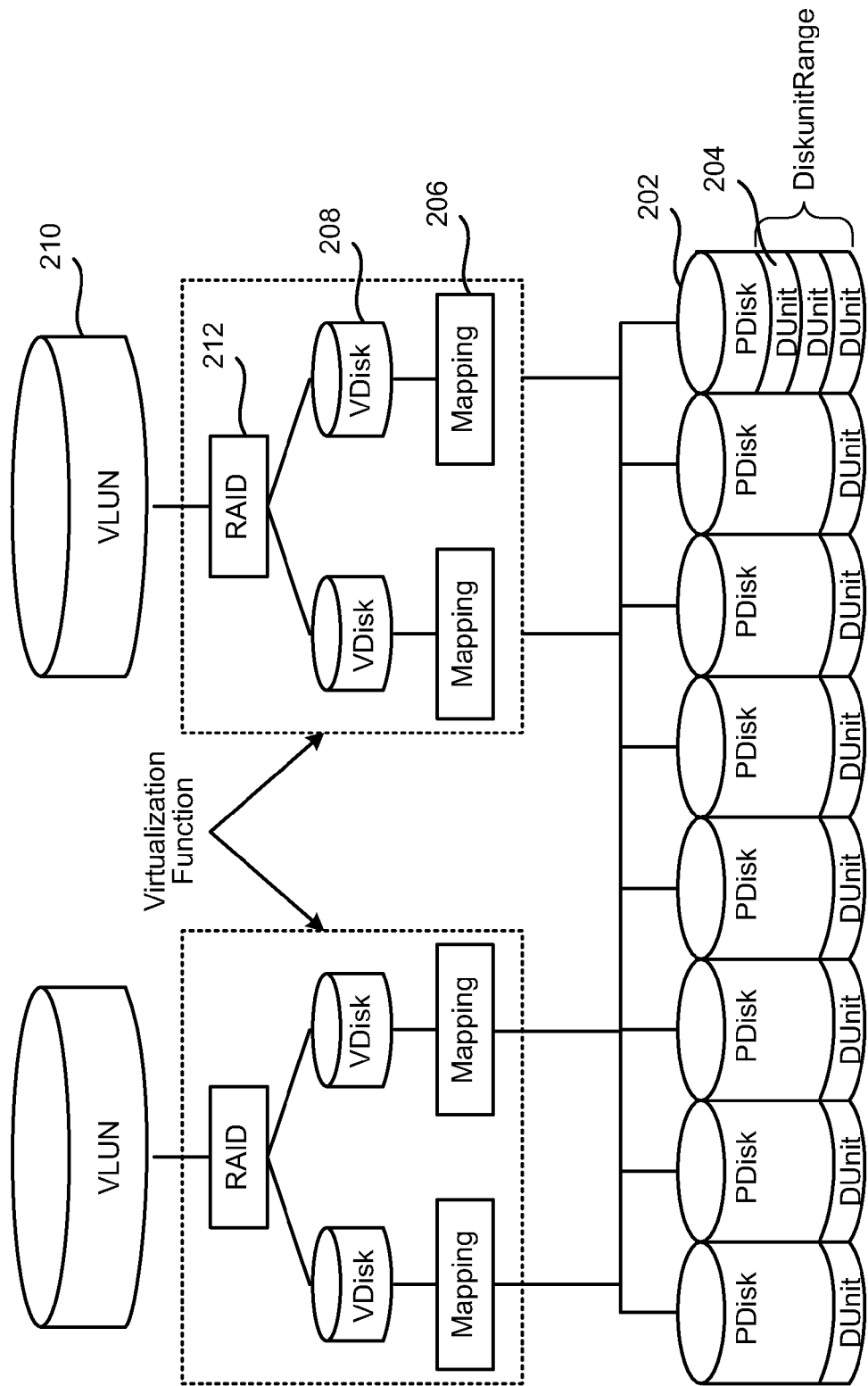
FIG. 2 is a block diagram illustrating an example of a virtualization model that may be implemented within a storage area network in accordance with various embodiments of the invention.

FIG. 2 is a block diagram illustrating an example of a virtualization model that may be implemented within a storage area network in accordance with various embodiments of the invention. As shown, the physical storage of the storage area network is made up of one or more physical LUNs, shown here as physical disks 202. Each physical LUN is a device that is capable of containing data stored in one or more contiguous blocks which are individually and directly accessible. For instance, each block of memory within a physical LUN may be represented as a block 204, which may be referred to as a disk unit (DUnit).

Through a mapping function 206, it is possible to convert physical LUN addresses associated with physical LUNs 202 to virtual LUN addresses, and vice versa. More specifically, as described above, the virtualization and therefore the mapping function may take place over one or more levels. For instance, as shown, at a first virtualization level, one or more virtual LUNs 208 each represents one or more physical LUNs 202, or portions thereof. The physical LUNs 202 that together make up a single virtual LUN 208 need not be contiguous. Similarly, the physical LUNs 202 that are mapped to a virtual LUN 208 need not be located within a single target. Thus, through virtualization, virtual LUNs 208 may be created that represent physical memory located in physically distinct targets, which may be from different vendors, and therefore may support different protocols and types of traffic.

Although the virtualization model may be implemented with a single level, a hierarchical arrangement of any number of levels may be supported by various embodiments of the present invention. For instance, as shown, a second virtualization level within the virtualization model of FIG. 2 is referred to as a high-level VLUN or volume 210. Typically, the initiator device "sees" only VLUN 210 when accessing data. In accordance with various embodiments of the invention, multiple VLUNs are "enclosed" within a virtual enclosure such that only the virtual enclosure may be "seen" by the initiator. In other words, the VLUNs enclosed by the virtual enclosure are not visible to the initiator.

In this example, VLUN 210 is implemented as a "logical" RAID array of virtual LUNs 208. Moreover, such a virtualization level may be further implemented, such as through the use of striping and/or mirroring. In addition, it is important to note that it is unnecessary to specify the number of virtualization levels to support the mapping function 206. Rather, an arbitrary number of levels of virtualization may be supported, for example, through a recursive mapping function. For instance, various levels of nodes may be built and maintained in a tree data structure, linked list, or other suitable data structure that can be traversed.

Each initiator may therefore access physical LUNs via nodes located at any of the levels of the hierarchical virtualization model. Nodes within a given virtualization level of the hierarchical model implemented within a given storage area network may be both visible to and accessible to an allowed set of initiators (not shown). However, in accordance with various embodiments of the invention, these nodes are enclosed in a virtual enclosure, and are therefore no longer visible to the allowed set of initiators. Nodes within a particular virtualization level (e.g., VLUNs) need to be created before functions (e.g., read, write) may be operated upon them. This may be accomplished, for example, through a master boot record of a particular initiator. In addition, various initiators may be assigned read and/or write privileges with respect to particular nodes (e.g., VLUNs) within a particular virtualization level. In this manner, a node within a particular virtualization level may be accessible by selected initiators.

As described above, various switches within a storage area network may be virtualization switches supporting virtualization functionality.

Figure 3A:
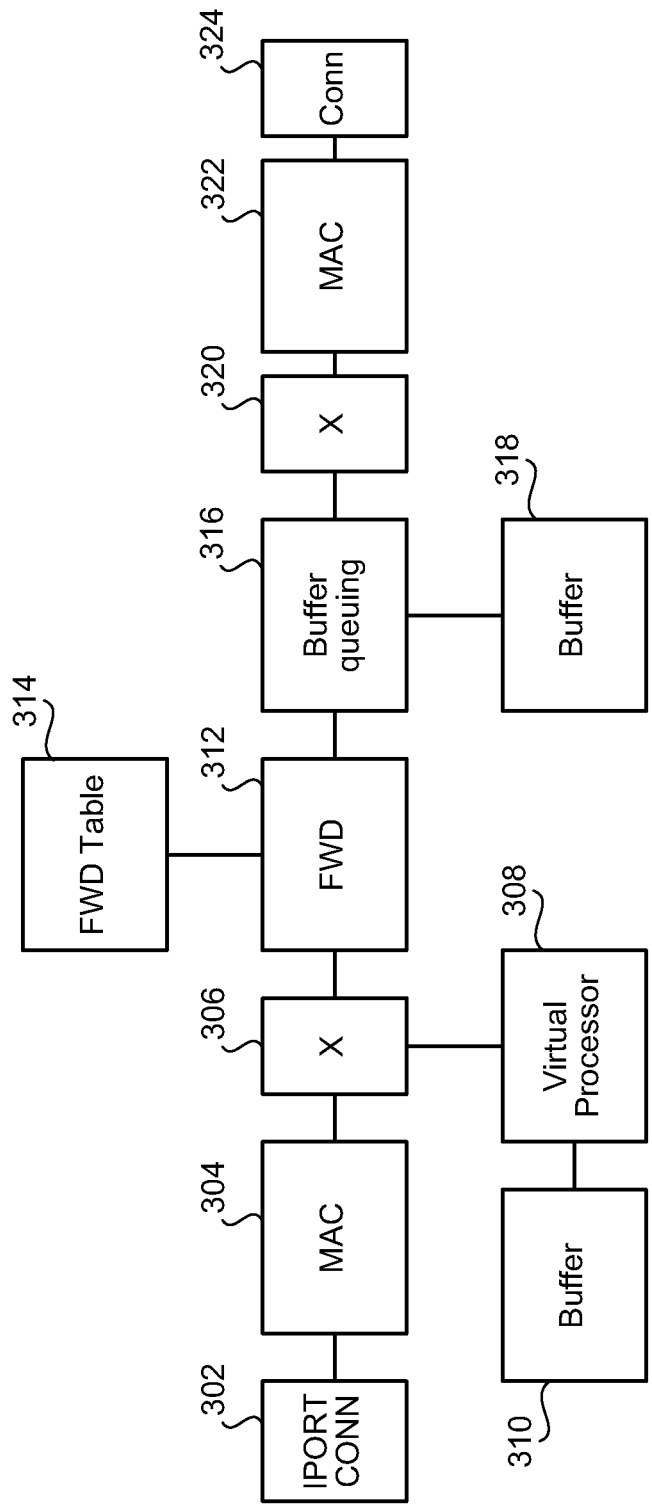
FIGS. 3A-C are block diagrams illustrating exemplary virtualization switches or portions thereof in which various embodiments of the present invention may be implemented.

FIG. 3A is a block diagram illustrating an exemplary virtualization switch in which various embodiments of the present invention may be implemented. As shown, data or messages are received by an intelligent, virtualization port (also referred to as an iPort) via a bi-directional connector 302. In addition, the virtualization port is adapted for handling messages on behalf of a virtual enclosure port, as will be described in further detail below. In association with the incoming port, Media Access Control (MAC) block 304 is provided, which enables frames of various protocols such as Ethernet or fibre channel to be received. In addition, a virtualization intercept switch 306 determines whether an address specified in an incoming frame pertains to access of a virtual storage location of a virtual storage unit representing one or more physical storage locations on one or more physical storage units of the storage area network. For instance, the virtual storage unit may be a virtual storage unit (e.g., VLUN) that is enclosed within a virtual enclosure.

When the virtualization intercept switch 306 determines that the address specified in an incoming frame pertains to access of a virtual storage location rather than a physical storage location, the frame is processed by a virtualization processor 308 capable of performing a mapping function such as that described above. More particularly, the virtualization processor 308 obtains a virtual-physical mapping between the one or more physical storage locations and the virtual storage location. In this manner, the virtualization processor 308 may look up either a physical or virtual address, as appropriate. For instance, it may be necessary to perform a mapping from a physical address to a virtual address or, alternatively, from a virtual address to one or more physical addresses.

Once the virtual-physical mapping is obtained, the virtualization processor 308 may then employ the obtained mapping to either generate a new frame or modify the existing frame, thereby enabling the frame to be sent to an initiator or a target specified by the virtual-physical mapping. The mapping function may also specify that the frame needs to be replicated multiple times, such as in the case of a mirrored write. More particularly, the source address and/or destination addresses are modified as appropriate. For instance, for data from the target, the virtualization processor replaces the source address, which was originally the physical LUN address with the corresponding virtual LUN and address. In the destination address, the port replaces its own address with that of the initiator. For data from the initiator, the port changes the source address from the initiator's address to the port's own address. It also changes the destination address from the virtual LUN/address to the corresponding physical LUN/address. The new or modified frame may then be provided to the virtualization intercept switch 306 to enable the frame to be sent to its intended destination.

While the virtualization processor 308 obtains and applies the virtual-physical mapping, the frame or associated data may be stored in a temporary memory location (e.g., buffer) 310. In addition, it may be necessary or desirable to store data that is being transmitted or received until it has been confirmed that the desired read or write operation has been successfully completed. As one example, it may be desirable to write a large amount of data to a virtual LUN, which must be transmitted separately in multiple frames. It may therefore be desirable to temporarily buffer the data until confirmation of receipt of the data is received. As another example, it may be desirable to read a large amount of data from a virtual LUN, which may be received separately in multiple frames. Furthermore, this data may be received in an order that is inconsistent with the order in which the data should be transmitted to the initiator of the read command. In this instance, it may be beneficial to buffer the data prior to transmitting the data to the initiator to enable the data to be re-ordered prior to transmission. Similarly, it may be desirable to buffer the data in the event that it is becomes necessary to verify the integrity of the data that has been sent to an initiator (or target).

The new or modified frame is then received by a forwarding engine 312, which obtains information from various fields of the frame, such as source address and destination address. The forwarding engine 312 then accesses a forwarding table 314 to determine whether the source address has access to the specified destination address. More specifically, the forwarding table 314 may include physical LUN addresses as well as virtual LUN addresses. The forwarding engine 312 also determines the appropriate port of the switch via which to send the frame, and generates an appropriate routing tag for the frame.

Once the frame is appropriately formatted for transmission, the frame will be received by a buffer queuing block 316 prior to transmission. Rather than transmitting frames as they are received, it may be desirable to temporarily store the frame in a buffer or queue 318. For instance, it may be desirable to temporarily store a packet based upon Quality of Service in one of a set of queues that each correspond to different priority levels. The frame is then transmitted via switch fabric 320 to the appropriate port. As shown, the outgoing port has its own MAC block 322 and bi-directional connector 324 via which the frame may be transmitted.

Figure 3B:
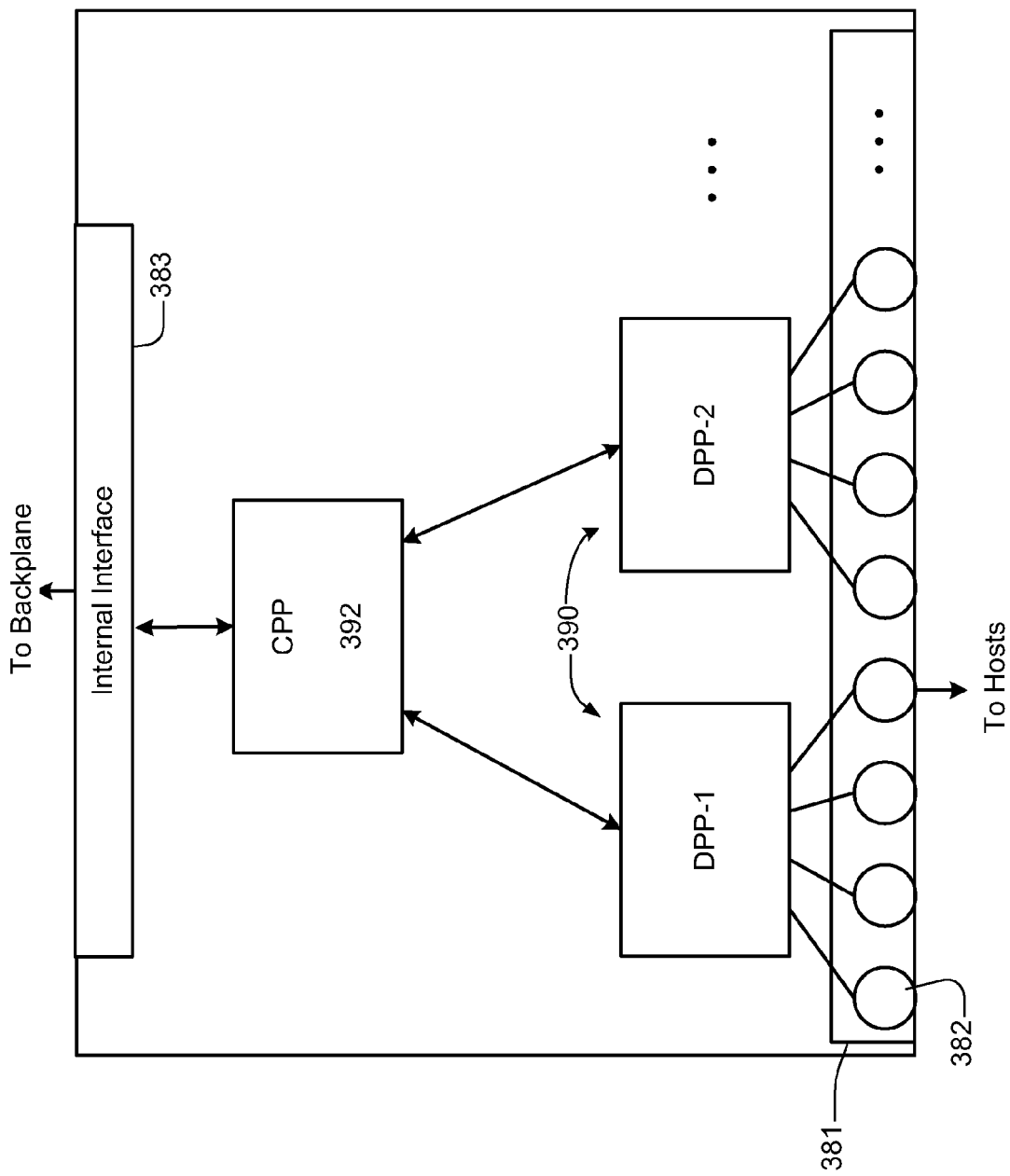

FIG. 3B is a block diagram illustrating a portion of an exemplary virtualization switch or intelligent line card in which various embodiments of the present invention may be implemented. According to a specific embodiment, switch portion 380 of FIG. 3B may be implemented as one of a plurality of line cards residing in a fibre channel switch such as that illustrated in FIG. 13, for example. In at least one implementation, switch portion 380 may include a plurality of different components such as, for example, at least one external interface 381, at least one data path processor (DPP) 390, at least one control path processor (CPP) 392, at least one internal interface 383, etc.

As shown in the example of FIG. 3B the external interface of 381 may include a plurality of ports 382 configured or designed to communicate with external devices such as, for example, host devices, storage devices, etc. One or more groups of ports may be managed by a respective data path processor (DPP) unit. According to a specific implementation the data path processor may be configured or designed as a general-purpose microprocessor used to terminate the SCSI protocol and to emulate N_Port/NL_Port functionality. It may also be configured to implement RAID functions for the intelligent port(s) such as, for example, striping and mirroring. In one embodiment, the DPP may be configured or designed to perform volume configuration lookup, virtual to physical translation on the volume address space, exchange state maintenance, scheduling of frame transmission, and/or other functions. In at least some embodiments, the ports 382 may be referred to as "intelligent" ports or "iPorts" because of the "intelligent" functionality provided by the managing DPPs. Additionally, in at least some embodiments, the term iPort and DPP may be used interchangeably when referring to such "intelligent" functionality. In a specific embodiment of the invention, the virtualization logic may be separately implemented at individual ports of a given switch. This allows the virtualization processing capacity to be closely matched with the exact needs of the switch (and the virtual enclosure) on a per port basis. For example, if a request is received at a given port for accessing a virtual LUN address location in the virtual volume, the DPP may be configured or designed to perform the necessary mapping calculations in order to determine the physical disk location corresponding to the virtual LUN address.

As illustrated in FIG. 3B, switch portion 380 may also include a control path processor (CPP) 392 configured or designed to perform control path processing for storage virtualization. In at least one implementation, functions performed by the control path processor may include, for example, calculating or generating virtual-to-physical (V2P) mappings, processing of port login and process login for volumes; hosting iPort VM clients which communicate with volume management (VM) server(s) to get information about the volumes; communicating with name server(s); etc.

Figure 3C:
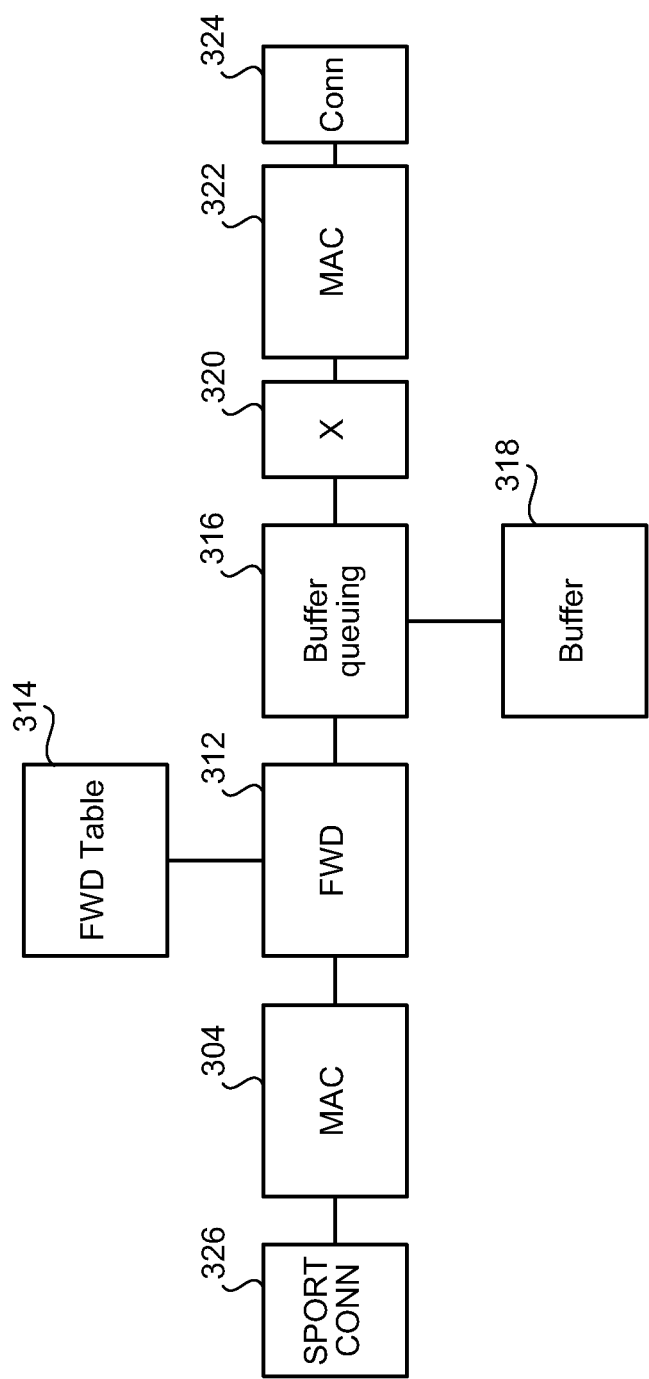

As described above, all switches in a storage area network need not be virtualization switches. In other words, a switch may be a standard switch in which none of the ports implement "intelligent," virtualization functionality. FIG. 3C is a block diagram illustrating an exemplary standard switch in which various embodiments of the present invention may be implemented. As shown, a standard port 326 has a MAC block 304. However, a virtualization intercept switch and virtualization processor such as those illustrated in FIG. 3A are not implemented. A frame that is received at the incoming port is merely processed by the forwarding engine 312 and its associated forwarding table 314. Prior to transmission, a frame may be queued 316 in a buffer or queue 318. Frames are then forwarded via switch fabric 320 to an outgoing port. As shown, the outgoing port also has an associated MAC block 322 and bi-directional connector 324. Of course, each port may support a variety of protocols. For instance, the outgoing port may be an iSCSI port (i.e. a port that supports SCSI over IP over Ethernet), which also supports virtualization, as well as parallel SCSI and serial SCSI.

Although the network devices described above with reference to FIG. 3A-C are described as switches, these network devices are merely illustrative. Thus, other network devices such as routers may be implemented to receive, process, modify and/or generate packets or frames with functionality such as that described above for transmission in a storage area network. Moreover, the above-described network devices are merely illustrative, and therefore other types of network devices may be implemented to perform the disclosed virtualization functionality.

In at least one embodiment, a storage area network may be implemented with virtualization switches adapted for implementing virtualization functionality as well as standard switches. Each virtualization switch may include one or more "intelligent" virtualization ports as well as one or more standard ports. In order to support the virtual-physical mapping and accessibility of memory by multiple applications and/or hosts, it is desirable to coordinate memory accesses between the virtualization switches in the fabric. In one implementation, communication between switches may be accomplished by an inter-switch link.

Figure 13:
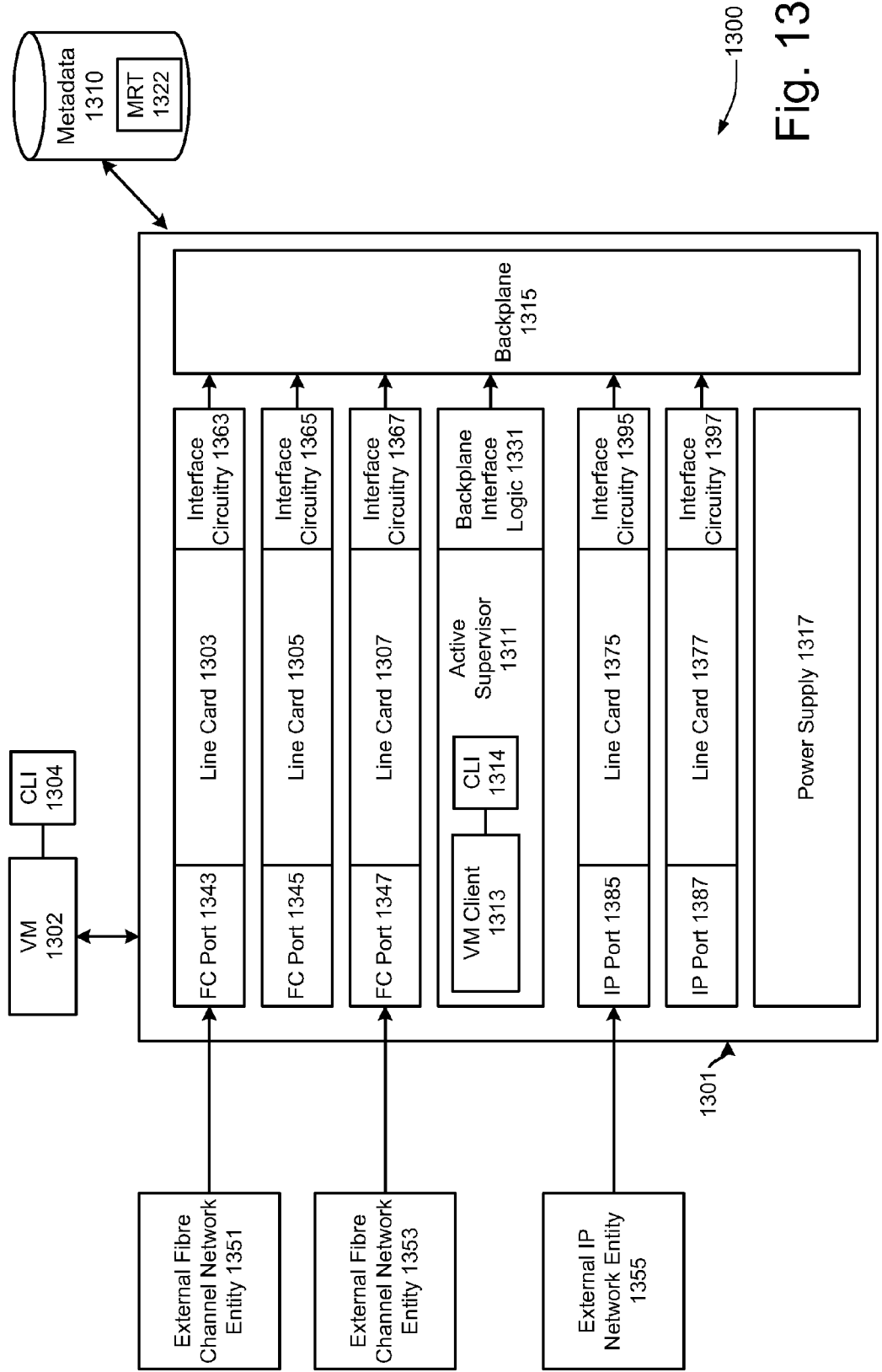
FIG. 13 is a diagrammatic representation of one example of a fibre channel switch 1301 that can be used to implement techniques of the present invention.

FIG. 13 is a diagrammatic representation of one example of a fibre channel switch 1301 that can be used to implement techniques of the present invention. Although one particular configuration will be described, it should be noted that a wide variety of switch and router configurations are available. The switch 1301 may include, for example, at least one interface for communicating with one or more virtual manager(s) 1302. In at least one implementation, the virtual manager 1302 may reside external to the switch 1301, and may also be accessed via a command line interface (CLI) 1304. The switch 1301 may include at least one interface for accessing external metadata information 1310 and/or Mirror Race Table (MRT) information 1322.

The switch 1301 may include one or more supervisors 1311 and power supply 1317. According to various embodiments, the supervisor 1311 has its own processor, memory, and/or storage resources. Additionally, the supervisor 1311 may also include one or more virtual manager clients (e.g., VM client 1313) which may be adapted, for example, for facilitating communication between the virtual manager 1302 and the switch.

Line cards 1303, 1305, and 1307 can communicate with an active supervisor 1311 through interface circuitry 1363, 1365, and 1367 and the backplane 1315. According to various embodiments, each line card includes a plurality of ports that can act as either input ports or output ports for communication with external fibre channel network entities 1351 and 1353. An example of at least a portion of a line card is illustrated in FIG. 3B of the drawings.

The backplane 1315 can provide a communications channel for all traffic between line cards and supervisors. Individual line cards 1303 and 1307 can also be coupled to external fibre channel network entities 1351 and 1353 through fibre channel ports 1343 and 1347.

External fibre channel network entities 1351 and 1353 can be nodes such as other fibre channel switches, disks, RAIDS, tape libraries, or servers. The fibre channel switch can also include line cards 1375 and 1377 with IP ports 1385 and 1387. In one example, IP port 1385 is coupled to an external IP network entity 1355. The line cards 1375 and 1377 also have interfaces 1395 and 1397 to the backplane 1315.

It should be noted that the switch can support any number of line cards and supervisors. In the embodiment shown, only a single supervisor is connected to the backplane 1315 and the single supervisor communicates with many different line cards. The active supervisor 1311 may be configured or designed to run a plurality of applications such as routing, domain manager, system manager, and utility applications. The supervisor may include one or more processors coupled to interfaces for communicating with other entities.

According to one embodiment, the routing application is configured to provide credits to a sender upon recognizing that a packet has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

According to specific embodiments of the present invention, a volume may be generally defined as collection of storage objects. Different types of storage objects may include, for example, disks, tapes, memory, other volume(s), etc. Additionally, in at least one embodiment of present invention a mirror may be generally defined as a copy of data. Different types of mirrors include, for example, synchronous mirrors, asynchronous mirrors, iMirrors, etc.

According to a specific embodiment, a mirrored configuration may exist when a volume is made of n copies of user data. In such a configuration, the redundancy level is n-1. The performance of a mirrored solution is typically slightly worse than a simple configuration for writes since all copies must be updated, and slightly better for reads since different reads may come from different copies. According to a specific embodiment, it is preferable that the diskunits from one physical drive are not used in more than one mirror copy or else the redundancy level will be reduced or lost. Additionally, in the event of a failure or removal of one physical drives, the access to the volume data may still be accomplished using one of the remaining mirror copies.

As described in greater detail below, a variety of features, benefits and/or advantages may be achieved by utilizing mirroring techniques such as those described herein. Examples of at least a portion of such benefits/advantages/features may include one or more of the following:

Redundancy (e.g., in the event a disk goes bad)—one reason for implementing a mirrored disk configuration is to maintain the ability to access data when a disk fails. In this case, user data on the failed physical disk ("Pdisk") is not lost. It may still be accessed from a mirror copy.

Disaster Recovery (e.g., in the event an earthquake or fire wipes out a building)—There is an advantage of having the multiple mirror copies that are not physically co-located. If one of the sites is struck by a catastrophe and all the data on the site is destroyed, the user may still continue to access data from one of the other mirror sites.

Faster Read Performance—Parallel processing is one of the standard computing techniques for improving system performance. Reading from mirrored disks is an example of this concept as applied to disk drives. The basic idea is to increase the number of disk drives, and therefore disk arms used to retrieve data. This is sometimes referred to as "increasing the number of spindles".

Addressable Mirror—According to a specific embodiment, it is possible to detach a mirror copy from the original volume and make it separately addressable. That is, the mirror copy may be accessed by addressing it as a separate volume, which, for example, may be separately addressable from the original volume. Such a feature provides additional features, benefits and/or advantages such as, for example:

Data Mining Application—The concept of addressable mirrors (e.g., explained below in more detail) allows the user to manipulate a specific mirror copy. For example, the user may run "what-if" scenarios by modifying the data in a mirror copy. This may be done while a mirror is online as well as offline. Furthermore, if the system keeps track of the modifications to the mirror copies, then the two mirror copies may be resynchronized later. An example of a mirror resynchronization process is illustrated, for example, in FIG. 12 of the drawings.

Backup—The concept of an addressable mirror may also be used to create backup of the user data. A mirror copy may be taken offline and user data may be backed up on a suitable storage media such as, for example, a tape or optical ROM. Some advantages of this scheme are: performance of the original volume is not affected; the backup is a consistent point-in-time copy of user data; etc. According to a specific embodiment, if the system keeps track of the modifications to the original volume, then the mirror copy may be resynchronized to the original volume at a later point in time.

FIG. 4A shows a block diagram of a network portion 400 illustrating a specific embodiment of how virtualization may be implemented in a storage area network. As illustrated in the example of FIG. 4A, the FC fabric 410 has been configured to implement a virtual volume 420 using an array of three physical disks (PDisks) (422, 424, 426). Typically, SCSI targets are directly accessible by SCSI initiators (e.g., hosts). In other words, SCSI targets such as PLUNs are visible to the hosts that are accessing those SCSI targets. Similarly, even when VLUNs are implemented, the VLUNs are visible and accessible to the SCSI initiators. Thus, each host must typically identify those VLUNs that are available to it. More specifically, the host typically determines which SCSI target ports are available to it. The host may then ask each of those SCSI target ports which VLUNs are available via those SCSI target ports.

In the example of FIG. 4A, it is assumed that Host A 402a uses port 401 to access a location in the virtual volume which corresponds to a physical location at PDisk A. Additionally, it is assumed that Host B 402b uses port 403 to access a location in the virtual volume which corresponds to a physical location at PDisk C. Accordingly, in this embodiment, port 401 provides a first instantiation of the virtual volume 420 to Host A, and port 403 provides a second instantiation of the virtual volume 420 to Host B. In network based virtualization, it is desirable that the volume remains online even in presence of multiple instances of the volume. In at least one implementation, a volume may be considered to be online if at least one host is able to access the volume and/or data stored therein.

As explained in greater detail below, if it is desired to perform online mirroring of the virtual volume 420, it is preferable that the mirror engine and the iPorts be synchronized while accessing user data in the virtual volume. Such synchronization is typically not provided by conventional mirroring techniques. Without such synchronization, the possibility of data corruption is increased. Such data corruption may occur, for example, when the mirror engine is in the process of copying a portion of user data that is concurrently being written by the user (e.g., host). In at least one embodiment, the term "online" may imply that the application is able to access (e.g., read, write, and/or read/write) the volume during the mirroring processes. According to least one embodiment of the present convention, it is preferable to perform online mirroring in a manner which minimizes the use of local and/or network resources (such as, for example, processor time, storage space, etc.)

FIG. 4B shows an example of storage area network portion 450, which may be used for illustrating various concepts relating to the technique of the present invention. According to at least one embodiment, one or more fabric switches may include functionality for instantiating and/or virtualizing one or more storage volumes to selected hosts. In one implementation, the switch ports and/or iPorts may be configured or designed to implement the instantiation and/or virtualization of the storage volume(s). For example, as illustrated in the example of FIG. 4B, a first port or iPort 452 may instantiate a second instance of volume V1 (which, for example, includes mirror1 master M1 and mirror2 copy M2) to Host H1. A second port or iPort 454 may instantiate a second instance of volume V1 to Host H2.

Many of the different features of the present invention relate to a variety of different mirroring concepts. An example of at least a portion of such mirroring concepts are briefly described below.

Synchronous and Asynchronous Mirrors—According to a specific embodiment, access operations relating to asynchronous mirrors may be offset or delayed by a given amount of time. For example, a write operation to an asynchronous mirror might be delayed for a specified time period before being executed. To help illustrate how this concept may affect mirroring operations, the following example is provided with reference to FIG. 4B of the drawings. In this example it is assumed that Host A (H1) is accessing volume V1 via iPort 452. volume V1 has two mirror copies, M1 and M2. M1 is synchronous and M2 is asynchronous. When the Host A issues a data write to V1, the iPort issues corresponding writes to M1 and M2. According to a specific embodiment, the iPort may be adapted to wait for the response from M1 before responding to the Host A. Once the iPort receives a response (e.g., write complete) from M1, the iPort may respond to the Host A with a "write complete" acknowledgment. However, in this example, the iPort does not wait for the response from M2 before responding to the host with a "write complete." However, because mirror M2 is an asynchronous mirror, it is possible that the data has not yet been written to M2, even though the iPort has already responded to the Host A with a "write complete." Accordingly, in at least some embodiments, it is preferable that data reads be performed from a synchronous mirror, and not an asynchronous mirror since, for example, if a read were to be performed from an asynchronous mirror, the read operation might return stale user data.

Local and Remote Mirrors—According to specific embodiments, a mirror may be local or remote relative to the host access to the volume. In one implementation, one measure of "remoteness" could relate to latency. For example, referring to FIG. 4, in one embodiment mirror M1 could be local relative to Host A and mirror M2 remote relative to Host A. Similarly, Host B might have mirror M2 as local and mirror M1 as remote. In such an embodiment, it may be desirable for the iPort(s) (e.g., 452) servicing Host A to redirect the read requests for volume V1 to mirror M1, and the iPort(s) (e.g., 454) servicing Host B to redirect read requests for volume V1 to mirror M2. According to a specific embodiment, the algorithm for choosing a mirror for performing read operation may be adapted to selected only mirrors that are synchronous. Furthermore, it may be preferable to favor the selection of a local mirror copy to perform the read operation.

Addressable mirror—In at least one embodiment of the present invention, not all individual mirror copies of a volume are not addressable by a host. According to a specific embodiment, it may be possible to split a mirror copy from the original volume (e.g., mirror master) and make the mirror copy independently addressable. Once detached, the mirror copy may be accessed by addressing it as a separate volume. More details on addressability of mirrors are presented below.

MUD Logs—MUD logs (i.e., Modified User Data logs) may be used to keep track of modifications made to user data which have occurred after a given point in time. According to a specific embodiment, the MUD logs may be maintained as one or more sets of epochs for each volume. In one implementation, MUD logs may be used to assist in performing mirror resynchronization operations, etc., as described greater detail below.

Mirror Consistency—According to at least one embodiment, the mirrors of a given volume may be determined to be "consistent" if they each have the exact same data, and there are currently no writes pending to the volume. Thus, for example, if the data read from the mirror copies is identical, the mirror copies may be deemed consistent.

According to a specific embodiment, there are at least two scenarios which may result in mirror data being inconsistent. One scenario may relate to iPort failure. Another Scenario may relate to multiple iPorts servicing a volume.

In the case of iPort failure and/or system failure, it is preferable that the user data be consistent on all the mirror copies. According to specific embodiments of the present invention, one the technique for helping to ensure the data consistency of all mirror copies is illustrated by way of the following example. In this example, it is assumed that an iPort failure has occurred. When the iPort failure occurs, there is a possibility that one or more of the writes to the volume may not have completed in all the mirror copies at the time of the iPort failure. This could result in one or more mirror copies being inconsistent. According to a specific embodiment, such a problem may be resolved by maintaining a Mirror Race Table (MRT) which, for example, may include log information relating to pending writes (e.g., in the case of a mirrored volume). In one implementation, a switch (and/or iPort) may be adapted to add an entry in the MRT before proceeding with any write operation to the mirrored volume. After the write operation is a success across all mirrors, the entry may be removed from the MRT. According to different embodiments, the entry may be removed immediately, or alternatively, may be removed within a given time period (e.g., within 100 milliseconds). Additional details relating to the mirror consistency and the MRT are described below.

In the case of multiple iPorts servicing a volume, one technique for ensuring mirror consistency is via one or more mechanisms for the serializing and/or locking of writes to the volume. According to one implementation, such serialization/locking mechanisms may also be implemented in cases of a single iPort servicing a volume. To help illustrate this concept, the following example is provided with reference to FIG. 4B of the drawings. In this example it is assumed that Host A (H1) and Host B (H2) are accessing a volume V1 (which includes two mirror copies M1 and M2), via iPorts 452 and 454 respectively. Host A issues a write of data pattern "0xAAAA" at the logical block address (LBA) 0. Host B issues a write of data pattern "0xBBBB" at the LBA 0. It is possible that the Host B write reaches M1 after the Host A write, and that the Host A write reaches M2 after the Host B write. If such a scenario were to occur, LBA 0 of M1 would contain the data pattern "0xBBBB", and LBA 0 of M2 would contain the data pattern "0xAAAA". At this point, the two mirror copies M1, M2 would be inconsistent. However, according to a specific embodiment of the present invention, such mirror inconsistencies may be avoided by implementing serialization through locking. For example, in one implementation, when an iPort receives a write command from a host, the iPort may send a lock request to a lock manager (e.g., 607, FIG. 6). Upon receiving the lock request, the lock manager may access a lock database to see if the requested region has already been locked. If the requested region has not already been locked, the lock manager may grant the lock request. If the requested region has already been locked, the lock manager may deny the lock request.

In one implementation, an iPort may be configured or designed to wait to receive a reply from the lock manager before accessing a desired region of the data storage. Additionally, according to a specific embodiment, unlike lock requirements for other utilities, the rest of the iPorts need not be notified about regions locked by other ports or iPorts.

Figure 5:
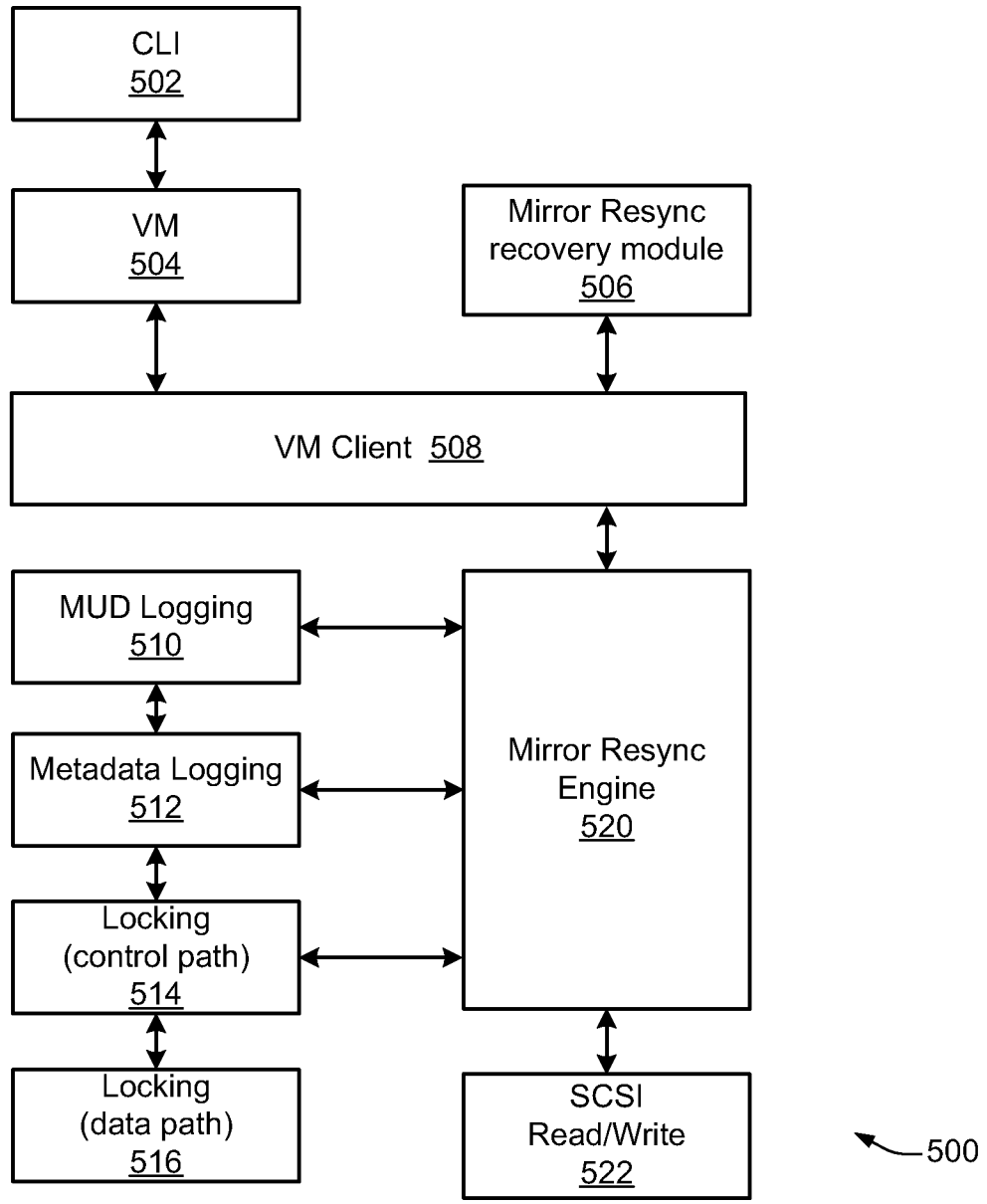
FIG. 5 shows an example of different processes which may be implemented in accordance with a specific embodiment of a storage area network of the present invention.

FIG. 5 shows an example of different processes which may be implemented in accordance with a specific embodiment of a storage area network of the present invention. In at least one implementation, one or more of the processes shown in FIG. 5 may be implemented at one or more switches (and/or other devices) of the FC fabric. As illustrated in the example of FIG. 5, SAN portion 500 may include one or more of the following processes and/or modules:

Command Line Interface (CLI) 502. According to a specific embodiment, the CLI 502 may be adapted to provide received user input to at least one virtual manager (VM) 504.

Virtual Manager (VM) 504. According to a specific embodiment, the VM 504 may be adapted to maintain and/or manage information relating to network virtualization such as, for example, V2P mapping information. Additionally, a volume management entity (such as, for example, Virtual Manager 504) may be configured or designed to handle tasks relating to mirror consistency for a given volume.

Mirror Resync Recovery module 506. According to a specific embodiment, the Mirror Resync Recovery Module 506 may be adapted to implement appropriate processes for handling error recovery relating to mirror synchronization. For example, in one implementation, the Mirror Resync Recovery module may be adapted to perform recovery operations in case of a Resync Engine failure such as, for example: detecting Resync Engine failure; designating a new iPort/process to continue the resync operation; etc.

Volume Manager Client (VM Client) 508. According to a specific embodiment, the VM Client 508 may be adapted to facilitate communication between the virtual manager 504 and switch components such as, for example, CPPs. The VM client may also provide a communication layer between the VM and Resync Engine. In one implementation, the VM Client may request an iPort to initiate a mirror resync process and/or to provide the status of a resync process.

MUD Logging module 510. According to a specific embodiment, the MUD Logging module 510 may be adapted to maintain a modified user data (MUD) logs which, for example, may be used for mirror synchronization operations.

Mirror Resync Engine 520. According to a specific embodiment, the Mirror Resync Engine 520 may be adapted to handle one or more procedures relating to mirror synchronization. In at least one embodiment, mirror synchronization may include one or more mirror resynchronization operations.

Metadata Logging module 512. According to a specific embodiment, the Logging module 512 may be adapted to maintain and/or manage information relating to mirror synchronization operations. For example, in one implementation, Logging module 512 may be adapted to maintain metadata relating to active regions of one or more volumes/mirrors which, for example, are currently being accessed by one or more mirror synchronization/resynchronization processes. The Metadata logging module 512 may also be adapted to provide stable storage functionality to the Resync Engine, for example, for storing desired state information on the Metadata disk or volume.

Control Path Locking module 514. According to a specific embodiment, the Control Path Locking module 514 may be adapted to handle locking mechanisms for CPP initiated actions.

Data Path Locking module 516. According to a specific embodiment, the Data Path Locking module 516 may be adapted to handle locking mechanisms for DPP initiated actions.

SCSI Read/Write module 522. According to a specific embodiment, the SCSI Read/Write module 522 may be adapted to handle SCSI read/write operations.

In one implementation, the mirror Resync Engine 520 may be configured or designed to interact with various software modules to perform its tasks. For example, in one embodiment, the mirror Resync Engine may be configured or designed to run on at least one control path processor (CPP) of a port or iPort. Additionally, as illustrated in FIG. 6, the Resync Engine may be adapted to interface with the VM Client 508, MUD Logging module 510, Metadata Logging module 512, Locking module 514, SCSI read/write module 522, etc.

According to a specific embodiment, the Metadata logging module 512 may be adapted to provide stable storage functionality to the resync engine, for example, for storing desired state information on the Metadata disk or volume.

According to a specific embodiment, the Resync Engine may be configured or designed to act as a host for one or more volumes. The Resync engine may also be configured or designed to indicate which mirror copy it wants to read and which mirror copy it wants to write. Accordingly, in one implementation, the Resync Engine code running on the CPP directs the DPP (data path processor) to perform reads/writes to mirror copies in a volume. According to a specific implementation, the CPP does not need to modify the user data on the Pdisk. Rather, it may simply copy the data from one mirror to another. As a result, the CPP may send a copy command to the DPP to perform a read from one mirror and write to the other mirror. Another advantage of this technique is that the CPP does not have to be aware of the entire V2P mappings for M1 and M2 in embodiments where striping is implemented at M1 and/or M2. This is due, at least in part, to the fact that the datapath infrastructure at the DPP ensures that the reads/writes to M1 and M2 are directed in accordance with their striping characteristics.

Figure 6:
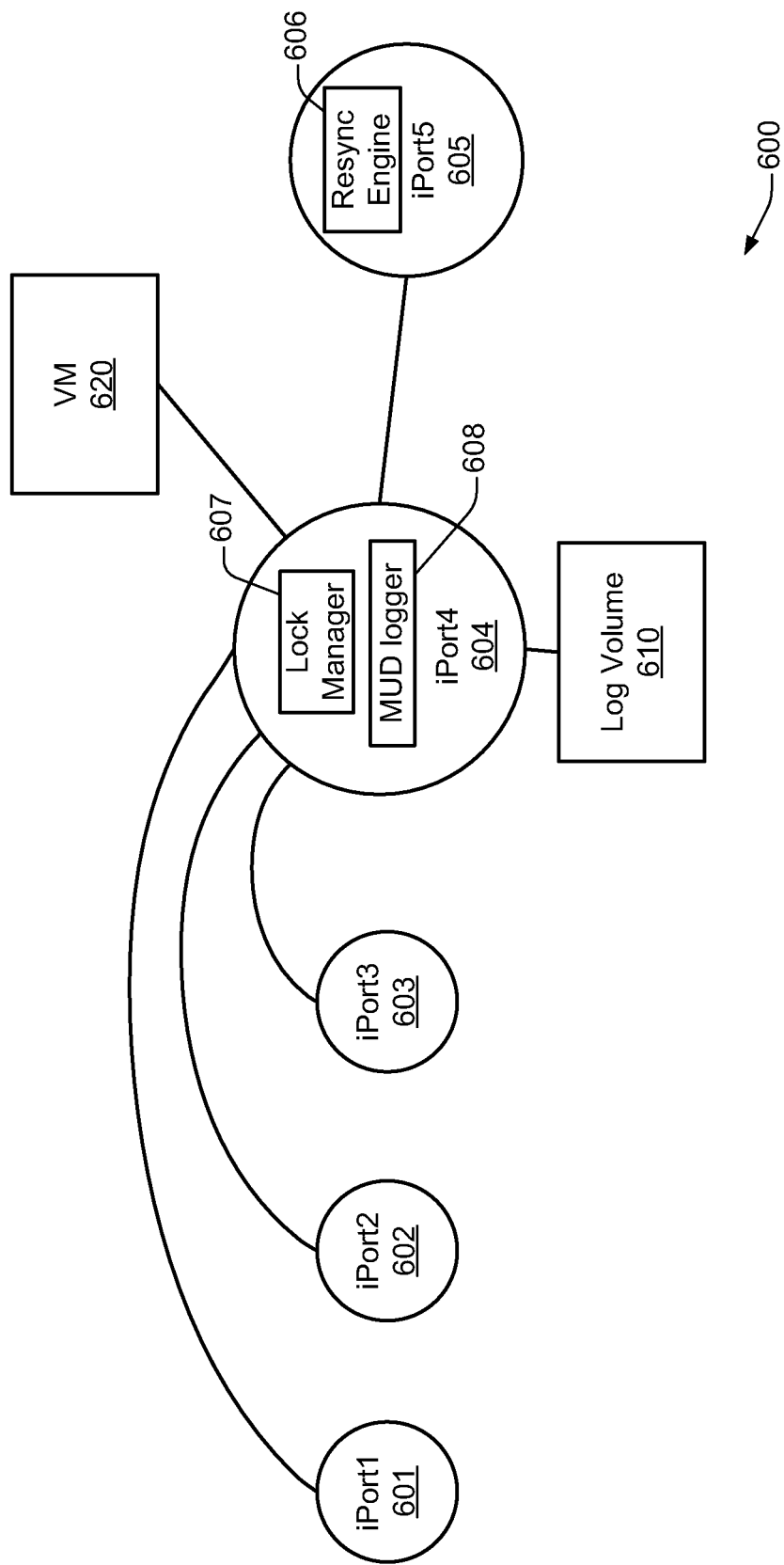
FIG. 6 shows a block diagram of an example of storage area network portion 600, which may be used for illustrating various aspects of the present invention.

FIG. 6 shows a block diagram of an example of storage area network portion 600, which may be used for illustrating various aspects of the present invention. In the example of FIG. 6, it is assumed that iPort4 (604) has been configured or designed to include functionality (e.g., lock manager 607) for managing one or more of the various locking mechanisms described herein, and has been configured or designed to provide access to Log Volume 610 and Virtual Manager (VM) 620. It is also assumed in this example that iPort5 605 includes functionality relating to the Resync Engine 606.

According to a specific embodiment, it is preferable for the Resync Engine and the iPorts to be synchronized while accessing user data, in order, for example, to minimize the possibility of data corruption. Such synchronization may be achieved, for example, via the use of the locking mechanisms described herein. According to a specific embodiment, a lock may be uniquely identified by one or more of the following parameters: operation type (e.g., read, write, etc.); Volume ID; Logical Block Address (LBA) ID; Length (e.g., length of one or more read/write operations); Fibre Channel (FC) ID; LOCK ID; Timestamp; etc. According to a specific implementation, each lock may be valid only for a predetermined length of time. Additionally one or more locks may include associated timestamp information, for example, to help in the identification of orphan locks. In case of a Resync Engine failure (in which the Resync Engine was a lock requester), the lock may be released during the resync recovery operations.

Additionally, in at least one implementation, it is preferable that the Mirror Resync Engine 606 and the iPorts (e.g., 601-605) have a consistent view of the MUD log(s). For example, if multiple iPorts are modifying user data, it may be preferable to implement mechanisms for maintaining the consistency of the MUD log(s). In order to achieve this, one or more of the MUD log(s) may be managed by a central entity (e.g., MUD logger 608) for each volume. Accordingly, in one implementation, any updates or reads to the MUD log(s) may be routed through this central entity. For example, as illustrated in FIG. 6, in situations where the Resync Engine 606 needs access to the MUD logs stored on Log Volume 610, the Resync Engine may access the desired information via MUD logger 608.

Mirror State Machine

Figure 7:
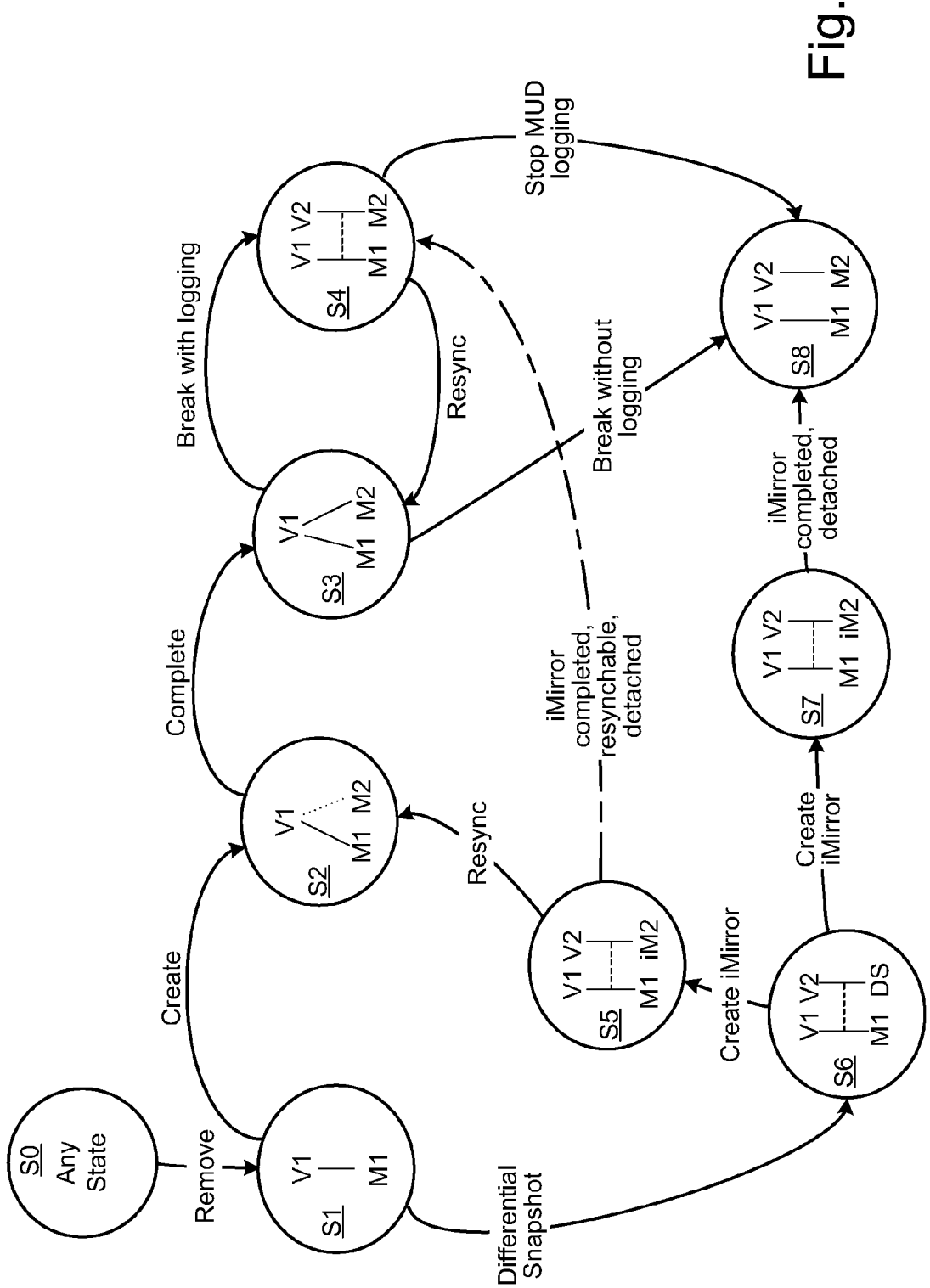
FIG. 7 shows an example of a specific embodiment of a Mirroring State Diagram 700 which may be used for implementing various aspects of the present invention.

FIG. 7 shows an example of a specific embodiment of a Mirroring State Diagram 700 which may be used for implementing various aspects of the present invention. As illustrated in the embodiment of FIG. 7, the Mirroring State Diagram 700 illustrates the various states of a volume, for example, from the point of view of mirroring. According to a specific embodiment, the Mirror State Diagram illustrates the various set of states and operations that may be performed on a mirrored volume. It will be appreciated that the Mirroring State Diagram of FIG. 7 is intended to provide the reader with a simplified explanation of the relationships between various concepts of the present invention such as, for example, iMirror, differential snapshots, mirror resync etc.

At state S1, a user volume V1 is shown. According to different embodiments, volume V1 may correspond to a volume with one or more mirror copies. However, it is assumed in the example of FIG. 7 that the volume V1 includes only a single mirror M1 at state S1. In one implementation, it is possible to enter this state from any other state in the state diagram.

According to a specific embodiment, a mirror copy of M1 may be created by transitioning from state S1 to S2 and then S3. During the transition from S1 to S2, one or more physical disk (Pdisk) units are allocated for the mirror copy (e.g., M2). From the user perspective, at least a portion of the Pdisks may be pre-allocated at volume creation time. During the transition from S2 to S3, a mirror synchronization process may be initiated. According to a specific embodiment, the mirror synchronization process may be configured or designed to copy the contents of an existing mirror copy (e.g., M1) to the new mirror copy (M2). In one implementation, during this process, the new mirror copy M2 may continue to be accessible in write-only mode. According to a specific embodiment, the mirror creating process may be characterized as special case of a mirror resync operation (described, for example, in greater detail below) in which the mirror resync operation is implemented on a volume that has an associated MUD Log of all ones, for example.

In at least one implementation, during the mirror creation process the VM may populate a new V2P table for the mirror which is being created (e.g., M2). In one implementation, this table may be populated on all the iPorts servicing the volume. A lookup of this V2P table provides V2P mapping information for the new mirror. In addition, the VM may instruct the iPorts to perform a mirrored write to both M1 and M2 (e.g., in the case of a write to V1), and to not read from M2 (e.g., in the case of a read to V1). In case of multiple iPorts servicing the volume, the VM may choose a port or iPort to perform and/or manage the Mirror creation operations.

Detached Mirror

Transitioning from S3 to S4, a user may detach a mirror copy (e.g., M2) from a volume (e.g., V1) and make the detached mirror copy separately addressable as a separate volume (e.g., V2). According to a specific embodiment, this new volume V2 may be readable and/or writeable. Potential uses for the detached mirror copy may include, for example, using the detached, separately addressable mirror copy to perform backups, data mining, physical maintenance, etc. The user may also be given the option of taking this new volume offline. According to different embodiments, state S4 may sometimes be referred to as an "offline mirror" or a "split mirror".

In one implementation of the present invention, additional functionality may be included for allowing a user to re-attach the detached mirror copy back to the original volume. Such functionality may be referred to as mirror resynchronization functionality. According to a specific embodiment, mirror resynchronization may be initiated by transitioning from S4 to S3 (FIG. 7). In one implementation, the mirror resynchronization mechanism may utilize MUD (Modified User Data) log information when performing resynchronization operations.

Accordingly, in at least one implementation, during the mirror detachment process (e.g., transitioning from S3 to S4), MUD logging may be enabled on the volume before detaching the mirror copy. According to a specific embodiment, the MUD logging mechanisms keep track of the modifications that are being made to either/both volumes. In one implementation, the MUD log data may be stored at a port or iPort which has been designated as the "master" port/iPort (e.g., MiP) for handling MUD logging, which, in the example of FIG. 4B, may be either iPort 452 or iPort 454. Thereafter, if the user desires to re-attach the mirror copy (e.g. M2) back to the original volume (e.g., M1), a mirror resync process may be initiated which brings the mirror copy (M2) back in synchronization with the original volume. During the mirror resync process, the mirror resync process may refer to the MUD log information relating to changes or updates to the original volume (e.g., M1) since the time when the mirror copy (M2) was detached. In one implementation, before starting the mirror resync process, the volume (e.g., V2) corresponding to the mirror copy may be taken offline. During the mirror resync process, the mirror copy (M2) may be configured as a write-only copy. Once the mirror resync process has completed, the volume (e.g., V1) may be in state S3, wherein the now synchronized mirror copy (M2) is online and is part of the original volume (V1).

In at least one implementation, if MUD logging operations for the mirror copy (e.g., M2) are stopped or halted (e.g., when transitioning from S4 to S8), or if the mirror copy is detached from the volume without enabling MUD logging on the detached mirror (e.g., when transitioning from S3 to S8), the result, as shown, for example, at S8, may be two independently addressable volumes (e.g., V1-M1 and V2-M2). In one implementation, both volumes may be adapted to allow read/write access. Additionally, in at least one implementation, the split mirrors (e.g., M1 and M2) may no longer be resyncable.

According to a specific embodiment, state S8 depicts two separately addressable volumes V1, V2 which have data that used to be identical. However, in state S8, there is no longer any relationship being maintained between the two volumes.

Mirror Resync

According to specific embodiments, a user may detach a mirror copy from a volume (e.g., V1) and make the detached mirror copy addressable as a separate volume (e.g., V2), which may be both readable and writeable. Subsequently, the user may desire to re-attach the mirror copy back to the original volume V1. According to one implementation, this may be achieved by enabling MUD (Modified User Data) logging before (or at the point of) detaching the mirror copy from the original volume V1. According to a specific embodiment, the MUD logger may be adapted to keep track of the modifications that are being made to both volumes V1, V2. In order to re-attach the mirror copy back to the original volume, a mirror resync process may be initiated which brings the mirror copy in synch with the original volume (or vice-versa). An example of a mirror resync process is illustrated in FIG. 12 of the drawings.

According to a specific embodiment, before starting the mirror resync process, the volume (e.g., V2) corresponding to the mirror copy may be taken offline. During the resync process, the mirror copy may be configured as a write-only copy. In one implementation, information written to the mirror copy during the resync process may be recorded in a MUD log. Once the mirror resync process is completed, the volume V1 may be in state S3 in which, for example, the mirror copy (e.g., M2) is online and is part of the original volume V1.

Figure 12:
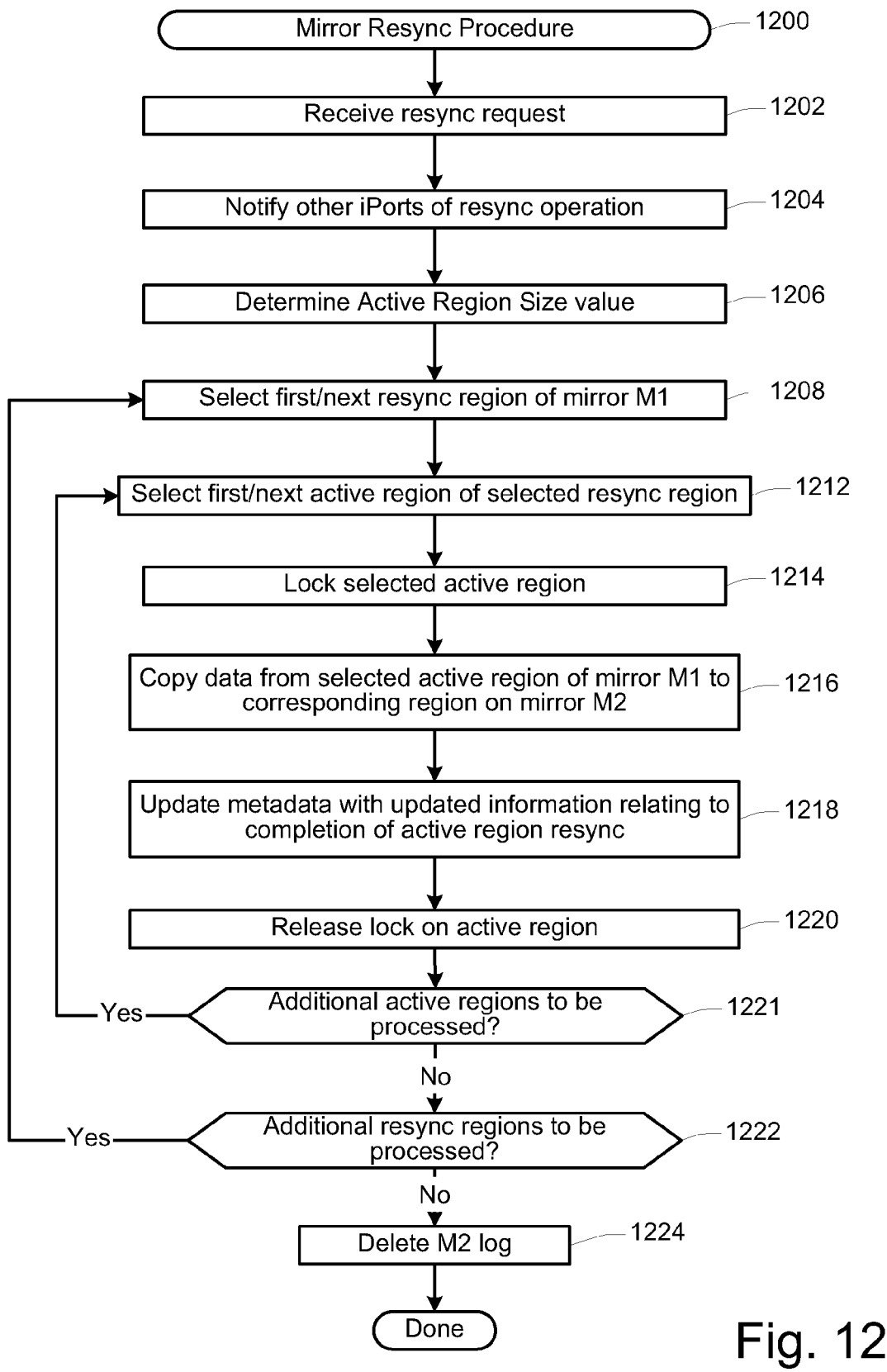
FIG. 12 shows a flow diagram of a Mirror Resync Procedure 1200 in accordance with a specific embodiment of the present invention.

FIG. 12 shows a flow diagram of a Mirror Resync Procedure 1200 in accordance with a specific embodiment of the present invention. In at least one implementation, the Mirror Resync Procedure 1200 may be implemented at one or more SAN devices such as, for example, FC switches, iPorts, Virtual Manager(s), etc. In one implementation, at least a portion of the Mirror Resync Procedure 1200 may be implemented by the Mirror Resync Engine 520 of FIG. 5.

For purposes of illustration, the Mirror Resync Procedure 1200 will be described by way of example with reference to FIG. 4B of the drawings. In this example it is assumed that a user at Host A initiates a request to resynchronize mirror M2 with mirror M1. According to a specific embodiment, the mirror resync request may include information such as, for example: information relating to the "master" mirror/volume to be synchronized to (e.g., M1); information relating to the "slave" mirror/volume to be synchronized (e.g., M2), mask information; flag information; etc. According to a specific embodiment, the mask information may specify the region of the volume that is to resynchronized. When the mirror resync request is received (1202) at iPort 452, the iPort may notify (1204) other iPorts of the resync operation. According to a specific embodiment, such notification may be achieved, for example, by updating appropriate metadata which may be stored, for example, at storage 1310 of FIG. 13. In at least one implementation, one or more of the other iPorts may use the updated metadata information in determining whether a particular volume is available for read and/or write access.

Using at least a portion of the information specified in the received resync request, an active region size (ARS) value is determined (1206). In at least one embodiment, the active region corresponds to the working or active region of the specified volume(s) (e.g., M1 and M2) for which resynchronizing operations are currently being implemented. In at least one implementation, the active region size value should be at least large enough to take advantage of the disk spindle movement overhead. Examples of preferred active region size values are 64 kilobytes, and 128 kilobytes. In at least one implementation, the active region size value may be set equal to the block size of an LBA (Logical Block Address) associated with the master volume/mirror (e.g., M1). Additionally, in at least one implementation, the active region size value may be preconfigured by a system operator or administrator. The preconfigured value may be manually selected by the system operator or, alternatively, may be automatically selected to be equal to the stripe unit size value of the identified volume(s).

At 1208 a first/next resync region of the identified volume (e.g., V1-M1) may be selected. According to a specific embodiment, selection of the current resync region may be based, at least in part, upon MUD log data. For example, the MUD log associated with M2 may be referenced to identify regions where the M2 data does not match the M1 data (for the same region). One or more of such identified regions may, in turn, be selected as a current resync region during the Mirror Resync Procedure. In at least one implementation, a resync region may include one or more potential active regions, depending upon the size of the resync region and/or the active region size.

At 1212 a first/next current active region (e.g., 1004, FIG. 10) is selected from the currently selected resync region, and locked (1214). According to a specific embodiment, the locking of the selected active region may include writing data to a location (e.g., metadata disk 1310, FIG. 13) which is available to at least a portion of iPorts in the fabric. According to a specific embodiment, the mirror Resync Engine may be configured or designed to send a lock request to the appropriate iPort(s). In one implementation, the lock request may include information relating to the start address and the end address of the region being locked. The lock request may also include information relating to the ID of the requester (e.g., iPort, mirror Resync engine, etc.).

At 1216, data is copied from the selected active region of the "master" mirror (M1) to the corresponding region of the "slave" mirror (M2). Once the copying of the appropriate data has been completed, the metadata may be updated (1218) with updated information relating to the completion of the resynchronization of the currently selected active region, and the lock on the currently selected active region may be released (1220). If it is determined (1221) that there are additional active regions to be processed in the currently selected resync region, a next active region of the selected resync region may be selected (1212) and processed accordingly.

According to a specific embodiment, after the Mirror Resync Procedure has finished processing the currently selected resync region, if desired, the corresponding M2 MUD log entry for the selected resync region may be deleted or removed.

At 1222 a determination is made as to whether there are additional resync regions to be processed. If so, a next resync region of the identified volume (e.g., V1-M1) may be selected and processed as described above. Upon successful completion of the Mirror Resync Procedure, M2 will be consistent with M1, and therefore, the M2 MUD log may be deleted 1224.

FIG. 10 shows a block diagram of a representation of a volume (or mirror) 1000 during mirroring operations (such as, for example, mirror resync operations) in accordance with a specific embodiment of the present invention. According to a specific embodiment, the volume may be divided into three regions while mirroring operations are in progress: (1) an ALREADY-DONE region 1002 in which mirroring operations have been completed; (2) an ACTIVE region 1004 in which mirroring operations are currently being performed; and a YET-TO-BE-DONE region 1006 in which mirroring operations have not yet been performed. In at least one implementation, the mirroring operations may include mirror resync operations such as those described, for example, with respect to the Mirror Resync Procedure of FIG. 12.

FIG. 11 shows a flow diagram of a Volume Data Access Procedure 1100 in accordance with a specific embodiment of the present invention. In at least one implementation, the Volume Data Access Procedure may be used for handling user (e.g., host) requests for accessing data in a volume undergoing mirroring operations. According to a specific embodiment, the Volume Data Access Procedure may be implemented at one or more switches and/or iPorts in the FC fabric.

As illustrated in the embodiment of FIG. 11, when a request for accessing a specified location in the volume is received (1102), the Volume Data Access Procedure determines (1104) the region (e.g., ALREADY-DONE, ACTIVE, or YET-TO-BE-DONE) in which the specified location is located. If it is determined that the specified location is located in the ALREADY-DONE region, then read/write (R/W) access may be allowed (1106) for the specified location. If it is determined that the specified location is located in the YET-TO-BE-DONE region, then R/W access is allowed (1110) to the master mirror (e.g., M1) and write only access is allowed for the slave mirror (e.g., M2). If it is determined that the specified location is located in the ACTIVE region, or if there is any overlap with the ACTIVE region, then the access request is held (1108) until the ACTIVE region is unlocked, after which R/W access may be allowed for both the master mirror (M1) and slave mirror (M2). According to a specific embodiment, at least a portion of this process may be handled by the active region locking/unlocking infrastructure.

In at least one implementation, a mirror resync engine (e.g., 520, FIG. 5) may be configured or designed to automatically and periodically notify the iPorts servicing the volume of the current ACTIVE region. The mirror resync engine may also log the value of the start of the ACTIVE region to stable storage. This may be performed in order to facilitate recovery in the case of mirror resync engine failure.

According to a specific implementation, after completing the mirror resync operations, the mirror resync engine may notify the VM. In the event that the mirror resync engine goes down, the VM may automatically detect the mirror resync engine failure, assign a new mirror resync engine. Once the mirror resync engine is instantiated, it may consult the log manager (e.g., metadata) to find out the current ACTIVE region for volume being mirrored.

It will be appreciated that the mirroring technique of the present invention provides a number of advantages over conventional mirroring techniques. For example, the online mirroring technique of the present invention provides for improved efficiencies with regard to network resource utilization and time. Additionally, in at least one implementation the online mirroring technique of the present invention may utilize hardware assist in performing data comparison and copying operations, thereby offloading such tasks from the CPU.

Another advantage of the mirroring technique of the present invention is that, in at least one implementation, the volume(s) involved in the resync operation(s) may continue to be online and accessible to hosts concurrently while the resync operations are being performed. Yet another advantage of the mirroring technique of the present invention is that it is able to used in presence of multiple instances of an online volume, without serializing the host accesses to the volume. In at least one implementation, access to a volume may be considered to be serialized if I/O operations for that volume are required to be processed by a specified entity (e.g., port or iPort) which, for example, may be configured or designed to manage access to the volume. In at least one implementation of the present invention, such serialization may be avoided, for example, by providing individual ports or iPorts with functionality for independently performing I/O operations at the volume while, for example, mirror resync operations are concurrently being performed on that volume. This feature provides the additional advantage of enabling increased I/O operations per second since multiple ports or iports are able to each perform independent I/O operations simultaneously. In at least one embodiment, at least a portion of the above-described features may be enabled via the use of the locking mechanisms described herein. Another distinguishing feature of the present invention is the ability to implement the Mirror Resync Procedure and/or other operations relating to the Mirroring State Diagram (e.g., of FIG. 7) at one or more ports, iPorts and/or switches of the fabric.

Differential Snapshot

Returning to FIG. 7, another novel feature of the present invention is the ability to create a "Differential Snapshot" (DS) of one or more selected mirror(s)/volume(s). According to a specific embodiment, a Differential Snapshot (DS) of a given volume/mirror (e.g., M1) may be implemented as a data structure which may be used to represent a snapshot of a complete copy of the user data of the volume/mirror as of a given point in time. However, according to a specific embodiment, the DS need not contain a complete copy of the user data of the mirror, but rather, may contain selected user data corresponding to original data stored in selected regions of the mirror (as of the time the DS was created) which have subsequently been updated or modified. An illustrative example of this is shown in FIGS. 8A and 8B of the drawings.

Figure 8B:
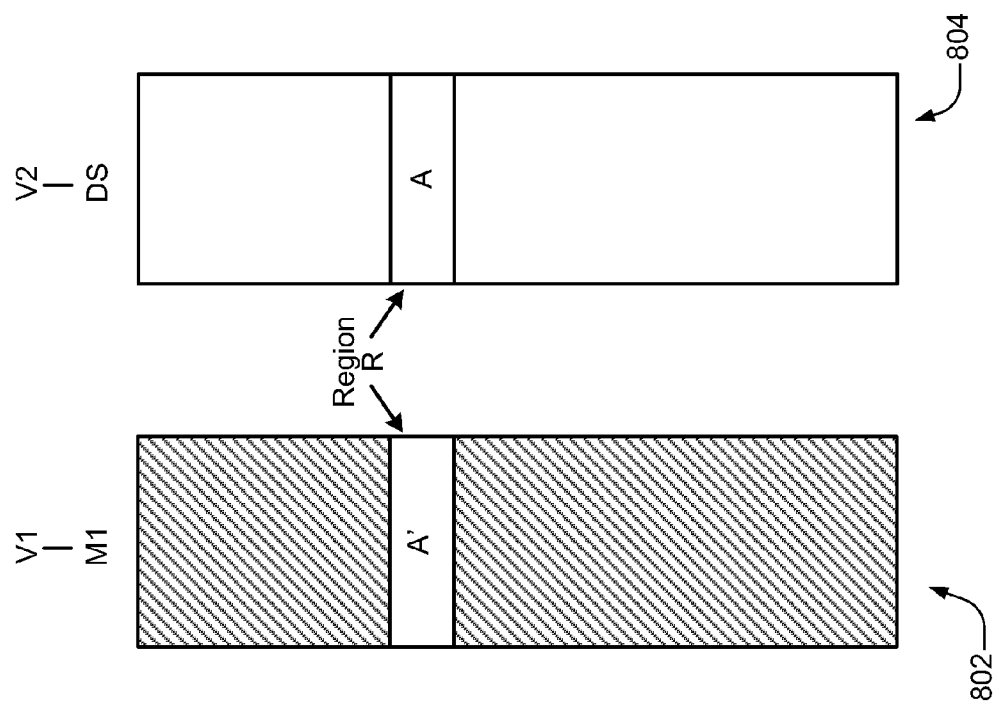
FIGS. 8A and 8B illustrate an example of a Differential Snapshot feature in accordance with a specific embodiment of the present invention.
Figure 8A:
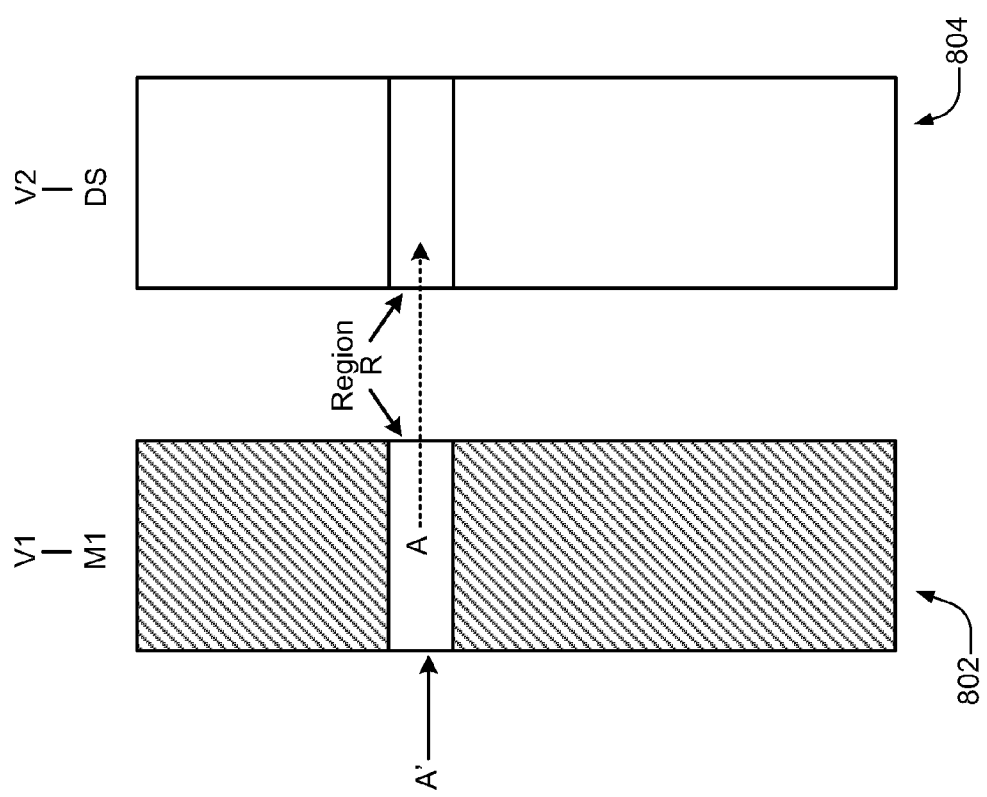

FIGS. 8A and 8B illustrate an example of a Differential Snapshot feature in accordance with a specific embodiment of the present invention. In the example of FIG. 8A, it is assumed that a Differential Snapshot (DS) 804 has been created at time $T_0$ of volume V1 802 (which corresponds to mirror M1). According to a specific implementation, the DS 804 may be initially created as an empty data structure (e.g., a data structure initialized with all zeros). Additionally, in at least one implementation, the DS may be instantiated as a separately or independently addressable volume (e.g., V2) for allowing independent read and/or write access to the DS. In at least one embodiment, the DS may be configured or designed to permit read-only access. In alternate embodiments (such as those, for example, relating to the iMirror feature of the present invention), the DS may be configured or designed to permit read/write access, wherein write access to the DS may be implemented using at least one MUD log associated with the DS.

According to a specific embodiment, the DS may be populated using a copy-on-first-write procedure wherein, when new data is to be written to a region in the original volume/mirror (e.g., V1), the old data from that region is copied to the corresponding region in the DS before the new data is written to M1. Thus, for example, referring to FIG. 8A, it is assumed in this example that Differential Snapshot (DS) 804 has been created at time $T_0$ of volume/mirror V1 802. Additionally, it is assumed that at time $T_0$ volume V1 included user data {A} at region R. Thereafter, it is assumed at time $T_1$ that new data {A'} is to be written to region R of volume V1. Before this new data is written into region R of volume V1, the old data {A} from region R of volume V1 is copied to region R of DS 804. Thus, as shown in FIG. 8B, after time $T_1$, the data stored in region R of volume V1 802 is {A'} and the data stored in region R of DS 804 is {A}, which corresponds to the data which existed at V1 at time $T_0$.

Additionally, in at least one implementation, a separate table (e.g., DS table) or data structure may be maintained (e.g., at Metadata disk 1310) which includes information about which regions in the DS have valid data, and/or which regions in the DS do not have valid data. Thus, for example, in one embodiment, the DS table may include information for identifying the regions of the original volume (V1) which have subsequently been written to since the creation of the DS. In another implementation, the DS table may be maintained to include a list of those regions in DS which have valid data, and those which do not have valid data.

Figure 14:
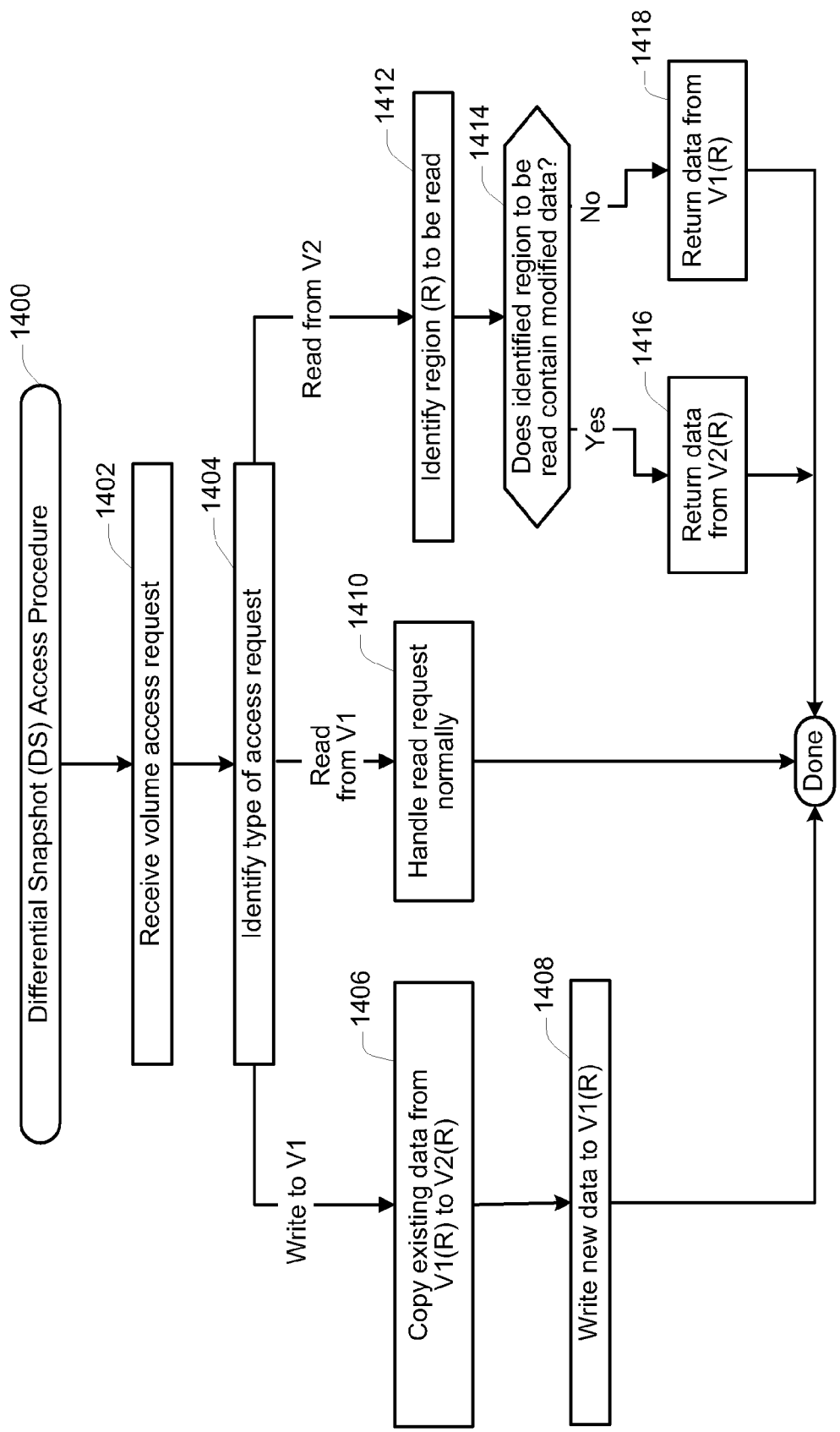
FIG. 14 shows a flow diagram of a Differential Snapshot Access Procedure 1400 in accordance with a specific embodiment of the present invention.

FIG. 14 shows a flow diagram of a Differential Snapshot Access Procedure 1400 in accordance with a specific embodiment of the present invention. In at least one implementation, the Differential Snapshot Access Procedure 1400 may be used for accessing (e.g., reading, writing, etc.) the data or other information relating to the Differential Snapshot. Additionally, in at least one implementation, the Differential Snapshot Access Procedure 1400 may be implemented at one or more ports, iPorts, and/or fabric switches. For purposes of illustration, the Differential Snapshot Access Procedure 1400 will be described by way of example with reference to FIG. 8A of the drawings. In the example of FIG. 8A, it is assumed that a Differential Snapshot (DS) 804 has been created at time $T_0$ of volume V1 802. After time $T_0$, when an access request is received (1402) for accessing volume V1, information from the access request may be analyzed (1404) to determine, for example the type of access operation to be performed (e.g., read, write, etc.) and the location (e.g., V1 or V2) where the access operation is to be performed.

In the example of FIG. 14, if it is determined that the access request relates to a write operation to be performed at a specified region of V1, existing data from the specified region of V1 is copied (1406) from to the corresponding region of the DS. Thus, for example, if the access request includes a write request for writing new data {A'} at region R of V1 (which, for example, may be notated as V1(R)), existing data at V1(R) (e.g., {A}) is copied to V2(R), which corresponds to region R of the DS. Thereafter, the new data {A'} is written (1408) to V1(R).

If, however, it is determined that the access request relates to a read operation to be performed at a specified region of V1, the read request may be processed according to normal procedures. For example, if the read request relates to a read request for data at V1(R), the current data from V1(R) may be retrieved and provided to the requesting entity.

If it is determined that the access request relates to a read operation to be performed at a specified region (e.g., region R) of V2, the region to be read is identified (1412), and a determination is made (1414) as to whether the identified region of V2 (e.g., V2(R)) contains any modified data. In at least one embodiment, modified data may include any data which was not originally stored at that region in the DS when the DS was first created and/or initialized. According to a specific embodiment, if it is determined that V2(R) contains modified data, then the data from V2(R) may be provided (1416) in the response to the read request. Alternatively, if it is determined that V2(R) does not contain modified data, then the data from V1(R) may be provided (1418) in the response to the read request.

iMirror

When a user desires to add a mirror to a volume using conventional mirroring techniques, the user typically has to wait for the entire volume data to be copied to the new mirror. Thus, for example, using conventional techniques, if the user requests to add a mirror to a volume at time $T_0$, the data copying may complete at time $T_1$, which could be hours or days after $T_0$, depending on the amount of data to be copied. Moreover, the mirror copy thus created corresponds to a copy of the volume at time $T_1$.

In light of these limitations, at least one embodiment of the present invention provides "iMirror" functionality for allowing a user to create a mirror copy (e.g., iMirror) of a volume (e.g., at time $T_0$) exactly as the volume appeared at time $T_0$. In at least one implementation, the copying process itself may finish at a later time (e.g., after time $T_0$), even though the mirror corresponds to a copy of the volume at time $T_0$.

According to a specific embodiment, an iMirror may be implemented as a mirror copy of a mirror or volume (e.g., V1) which is fully and independently addressable as a separate volume (e.g., V2). Additionally, in at least one embodiment, the iMirror may be created substantially instantaneously (e.g., within a few seconds) in response to a user's request, and may correspond to an identical copy of the volume as of the time (e.g., $T_0$) that the user requested creation of the iMirror.

According to different embodiments, a variety of different techniques may be used for creating an iMirror. Examples of two such techniques are illustrated in FIGS. 15-16 of the drawings.

Figure 15A:
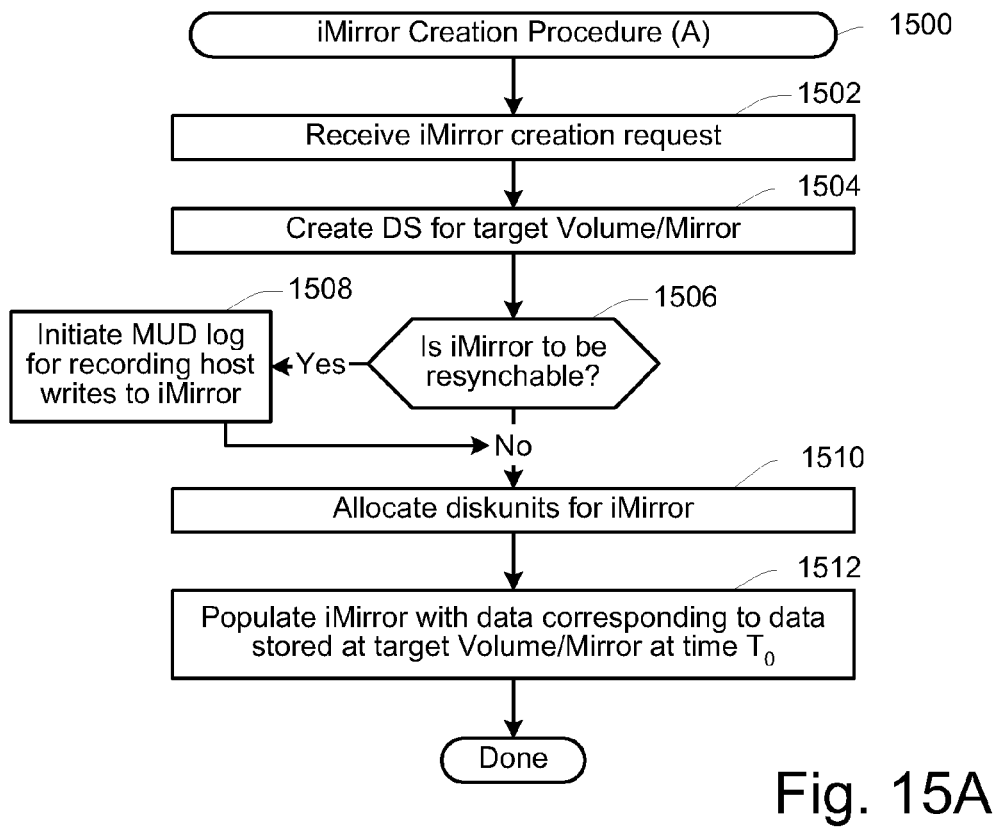
FIG. 15A shows a flow diagram of a first specific embodiment of an iMirror Creation Procedure 1500.
Figure 16:
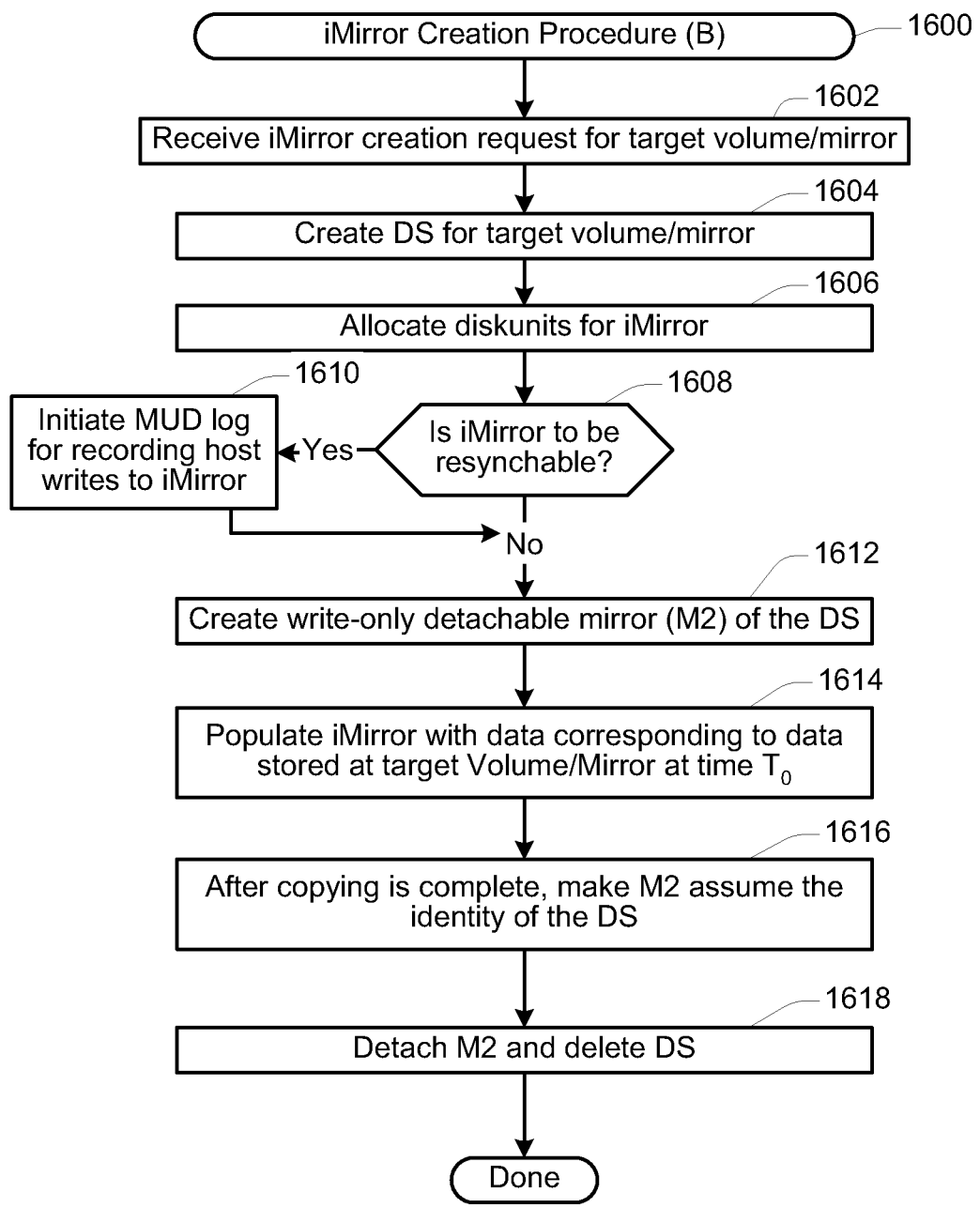
FIG. 16 shows a flow diagram of a second specific embodiment of an iMirror Creation Procedure 1600.

FIG. 15A shows a flow diagram of a first specific embodiment of an iMirror Creation Procedure 1500. In at least one embodiment, the iMirror Creation Procedure 1500 may be implemented at one or more SAN devices such as, for example, FC switches, ports, iPorts, Virtual Manager(s), etc. In the example of FIG. 15A, it is assumed at 1502 that an iMirror creation request is received. In this example, it is further assumed that the iMirror creation request includes a request to create an iMirror for the volume V1 (902) of FIG. 9. At 1504 a differential snapshot (DS) of the target volume/mirror (e.g., V1-M1) is created at time $T_0$. In one implementation, the DS may be configured to be writable and separately addressable (e.g., as a separate volume V2). In at least one implementation, the DS may be created using the DS creation process described previously, for example, with respect to state S6 of FIG. 7.

Returning to FIG. 15A, if it is determined (1506) that the iMirror is to be made resyncable (e.g., to the original volume V1), MUD log(s) of host writes to volume V1 and the DS (e.g., V2) may be initiated (1508) and maintained. In at least one embodiment, the MUD logging may be initiated at time $T_0$, which corresponds to the time that the DS was created. At 1510, physical storage (e.g., one or more diskunits) for the iMirror may be allocated. Thereafter, as shown at 1512, the iMirror may be populated with data corresponding to the data that was stored at the target volume/mirror (e.g., V1-M1) at time $T_0$.

As illustrated in the state diagram of FIG. 7, creation of a resyncable iMirror may be implemented, for example, by transitioning from state S1 to S6 to S5. Additionally, as illustrated in FIG. 7, creation of a non-resyncable iMirror may be implemented, for example, by transitioning from state S1 to S6 to S7.

Figure 15B:
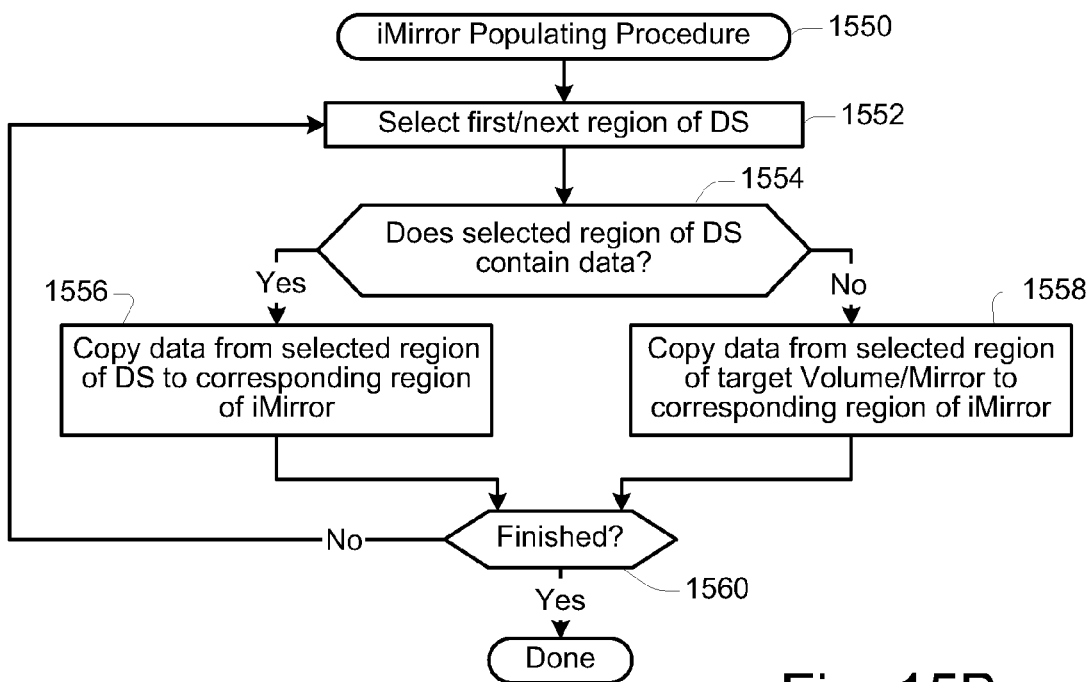
FIG. 15B shows a flow diagram of an iMirror Populating Procedure 1550 in accordance with a specific embodiment of the present invention.

FIG. 15B shows a flow diagram of an iMirror Populating Procedure 1550 in accordance with a specific embodiment of the present invention. In at least one embodiment, the iMirror Populating Procedure 1550 may be used for populating an iMirror with data, as described, for example, at 1512 of FIG. 15A. As shown at 1552 a first/next region (e.g., R) of the DS may be selected for analysis. The selected region of the DS may then be analyzed to determine (1554) whether that region contains data. According to a specific embodiment, the presence of data in the selected region of the DS (e.g., DS(R)) indicates that new data has been written to the corresponding region of the target volume/mirror (e.g., V1(R)) after time $T_0$, and that the original data which was stored at V1(R) at time $T_0$ has been copied to DS(R) before the new data was stored at V1(R). Such data may be referred to as "Copy on Write" (CoW) data. By the same reasoning, the lack of data at DS(R) indicates that V1(R) still contains the same data which was stored at V1(R) at time $T_0$. Such a data may be referred to as "unmodified original data". Accordingly, if it is determined that the selected region of the DS (e.g., DS(R)) does contain data, the data from DS(R) may be copied (1556) to the corresponding region of the iMirror (e.g., iMirror(R)). If, however, it is determined that the selected region of the DS (e.g., DS(R)) does not contain data, the data from V1(R) may be copied (1558) to the corresponding region of the iMirror (e.g., iMirror(R)). Thereafter, if it is determined (1560) that there are additional regions of the DS to be analyzed, a next region of the DS may be selected for analysis, as described, for example, above.

According to a specific implementation, the iMirror Populating Procedure may be implemented by performing a "touch" operation on each segment and/or region of the DS. According to a specific embodiment, a "touch" operation may be implemented as a zero byte write operation. If the DS segment/region currently being "touched" contains data, then that data is copied to the corresponding segment/region of the iMirror. If the DS segment/region currently being "touched" does not contain data, then data from the corresponding segment/region of the target volume/mirror will be copied to the appropriate location of the iMirror.

According to at least one implementation, while the iMirror is being populated with data, it may continue to be independently accessible and/or writable by one or more hosts. This is illustrated, for example, in the FIG. 9 of the drawings.

FIG. 9 shows a block diagram of various data structures which may be used for implementing a specific embodiment of the iMirror technique of the present invention. In the example of FIG. 9, it is assumed that a resyncable iMirror is to be created of volume V1 (902). At time $T_0$ it is assumed that the DS data structure 904 (which is implemented as a differential snapshot of volume V1) is created. Initially, at time $T_0$, the DS 904 contains no data. Additionally, it is assumed that, at time $T_0$ volume V1 included user data {A} at region R. At time $T_1$, it is assumed that new data {A'} was written to V1(R), and that the old data {A} from V1(R) was copied to DS(R). Thus, as shown in FIG. 9, the data stored in V1(R) is {A'} and the data stored in DS(R) is {A}, which corresponds to the data which existed at V1(R) at time $T_0$. As illustrated in the example of FIG. 9, the DS 904 may be implemented as a separately or independently addressable volume (e.g., V2) which is both readable and writable. Because the DS 904 represents a snapshot of the data stored at volume V1 at time $T_0$, host writes to V2 which occur after time $T_0$ may be recorded in MUD log 906. For example, in the example of FIG. 9 it is assumed that, at time $T_2$, a host write transaction occurs in which the data {B} is written to region R of the DS 904. However, rather than writing the data {B} at DS(R), details about the write transaction are logged in the MUD log 906 at 906a. According to a specific embodiment, such details may include, for example: the region(s)/sector(s) to be written to, data, timestamp information, etc.

According to a specific embodiment, after the iMirror has been successfully created and populated, the iMirror may assume the identity of the volume V2, and the DS 904 may be deleted. Thereafter, MUD log 906 may continue to be used to record write transactions to volume V2 (which, for example, may correspond to iMirror iM2).

FIG. 16 shows a flow diagram of a second specific embodiment of an iMirror Creation Procedure 1600. In the example of FIG. 16, it is assumed at 1602 that an iMirror creation request is received. In this example, it is further assumed that the iMirror creation request includes a request to create an iMirror for the volume V1 (902) of FIG. 9. At 1604 a differential snapshot (DS) of the target volume/mirror (e.g., V1-M1) is created at time $T_0$. In one implementation, the DS may be configured to be writable and separately addressable (e.g., as a separate volume V2). In at least one implementation, the DS may be created using the DS creation process described previously, for example, with respect to state S6 of FIG. 7.

Returning to FIG. 16A, At 1606, physical storage (e.g., one or more diskunits) for the iMirror may be allocated. If it is determined (1608) that the iMirror is to be made resyncable, MUD log(s) of host writes to the target volume V1 and the DS (e.g., V2) may be initiated (1610) and maintained. In at least one embodiment, the MUD logging may be initiated at time $T_0$, which corresponds to the time that the DS was created. At 1612, a write-only detachable mirror (e.g., M2) of the DS may be created. At 1614, the mirror M2 may be populated with data derived from the DS. According to a specific implementation, the data population of mirror M2 may be implemented using a technique similar to the iMirror Populating Procedure 1550 of FIG. 15B. After the data population of mirror M2 has been completed, mirror M2 may be configured (1616) to assume the identity of the DS. Thereafter, mirror M2 may be detached (1618) from the DS, and the DS deleted. At this point, mirror M2 may be configured as an iMirror of volume V1 (as of time $T_0$), wherein the iMirror is addressable as a separate volume V2. In at least one implementation, the MUD logging of V2 may continue to be used to record write transactions to volume V2.

It will be appreciated that there may be some performance overhead associated with maintaining MUD logs. This is one reason why a user might want to create a non-resyncable iMirror. Accordingly, in the state diagram example of FIG. 7, one difference between state S5 and S7 is that the iMirror iM2 of state S7 represents a non-resyncable iMirror, whereas the iMirror iM2 of state S5 represents a resyncable iMirror. According to a specific embodiment, the iMirror of either state S5 or S7 may contain a complete copy of V1 (or M1) as of time $T_0$. In one implementation, states S4 and S8 respectively depict the completion of the iMirror creation. Additionally, in one implementation, states S4 and S8 correspond to the state of the iMirror at time $T_1$. In at least one embodiment, it is also possible to create MUD logs using the information in S6 and thus transition to state S5.

Mirror Consistency

According to specific embodiments, the technique of the present invention provides a mechanism for performing online mirror consistency checks. In one implementation, an exhaustive consistency check may be performed, for example, by comparing a first specified mirror copy with a second specified mirror copy. In one embodiment, a read-read comparison of the two mirrors may be performed, and if desired restore operations may optionally be implemented in response.

Figure 17:
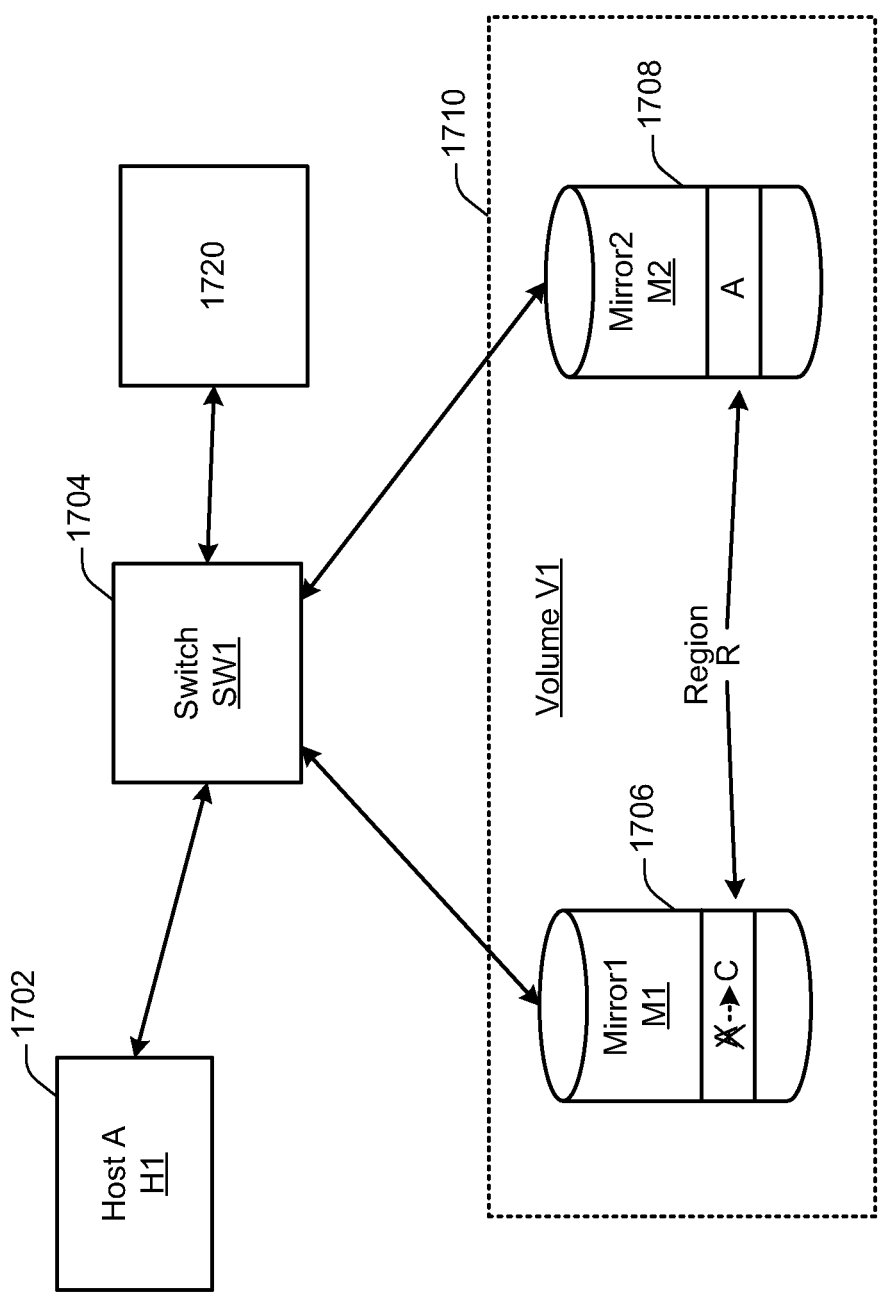
FIG. 17 shows a block diagram of a specific embodiment of a storage area network portion 1750 which may be used for demonstrating various aspects relating to the mirror consistency techniques of the present invention.

FIG. 17 shows a block diagram of a specific embodiment of a storage area network portion 1750 which may be used for demonstrating various aspects relating to the mirror consistency techniques of the present invention.

As illustrated in the example of FIG. 17, switch 1704 may instantiate (e.g., to Host A 1702) volume V1, which includes two mirror copies, namely mirror M1 1706 and mirror M2 1708. In at least one embodiment of the present invention, when Host A requests a write operation to be performed at volume V1, the data may be written to both mirror M1 and mirror M2. However, in at least one implementation, the writes to mirror M1 and mirror M2 may not necessarily occur simultaneously. As a result, mirror consistency issues may arise, as illustrated, for example, in the example of FIG. 17. In this example, it is assumed that the data {A} is stored at region R of mirrors M1 and M2 at time $T_0$. At time $T_1$, it is assumed that Host A sends a write request to switch 1704 for writing the data {C} to region R of volume V1 (e.g., V1(R)). In response, the switch initiates a first write operation to be performed to write the data {C} at M1(R), and a second write operation to be performed to write the data {C} at M2(R). However, in the example of FIG. 17, it is assumed that a failure occurs at switch 1704 after the first write request has been completed at M1, but before the second write request has been completed at M2. Thus, at this point, the mirrors M1 and M2 are not consistent since they each contain different data at region R.

One technique for overcoming mirror inconsistency caused by such a situation is to maintain a Mirror Race Table (MRT) as shown, for example, at 1720 of FIG. 17. In one implementation, the Mirror Race Table may be configured or designed to maintain information relating to write operations that are to be performed at M1 and M2 (and/or other desired mirrors associated with a given volume). For example, in one implementation, Mirror Race Table may be implemented as a map of the corresponding regions or sectors of mirrors M1, M2, with each region/sector of M1, M2 being represented by one or more records, fields or bits in the MRT. In one implementation, when a write operation is to be performed at a designated region of the volume (e.g., at V1(R)), the corresponding field(s) in the MRT may be updated to indicate the possibility of inconsistent data associated with that particular sector/region. For example, in one implementation, the updated MRT field(s) may include a first bit corresponding to M1(R), and a second bit corresponding to M2(R). When the write operation is completed at M1(R), the first bit may be updated to reflect the completion of the write operation. Similarly, when the write operation is completed at M2(R), the second bit may be updated to reflect the completion of the write operation. If the bits values are not identical, then there is a possibility that the data at this region of the mirrors is inconsistent.

In another implementation, the updated MRT field(s) may include at least one bit (e.g., a single bit) corresponding to region R. When a write operation is to be performed at V1(R), the bit(s) in the MRT corresponding to region R may be updated to indicate the possibility of inconsistent data associated with that particular sector/region. When it has been confirmed that the write operation has been successfully completed at both M1(R) and M2(R), the corresponding bit in the MRT may be updated to reflect the successful completion of the write operation, and thus, consistency of data at M1(R) and M2(R).

According to a specific embodiment, the MRT information may be stored in persistent storage which may be accessible to multiple ports or iPorts of the SAN. In one implementation, the MRT information may be stored and/or maintained at the metadata disk (as shown, for example, at 1322 of FIG. 13).

In one implementation, a fast consistency check may be performed, for example, by using the MRT information to compare a first mirror copy against another mirror copy which, for example, is known to be a good copy. In one embodiment, a read-read comparison of the two mirrors may be performed, and if desired, restore operations may optionally be implemented in response.

Error Conditions

Different embodiments of the present invention may incorporate various techniques for handling a variety of different error conditions relating to one or more of the above-described mirroring processes. Examples of at least some of the various error condition handling techniques of the present invention are described below.

In the event of an error occurring during a read from a mirror copy, the iPort requesting the read operation may be instructed to read from another mirror copy. In one implementation, it is preferable to find a good mirror copy and correct the bad one. For the bad mirror copy, the iPort may initiate a 'reassign diskunit' operation in order to relocate data to another diskunit. The iPort may also log this information.

Similarly, if there is an error during a write, the iPort may correct the bad mirror copy using data obtained from a good mirror copy. The iPort may also initiate a 'reassign diskunit' operation for the bad mirror copy. If there is no mirror copy that has good copy of the user data, then information relating to the error (e.g., LBA, length, volume ID, mirror ID, etc.) may be stored in a Bad Data Table (BTD).

According to a specific embodiment, the VM may be configured or designed to monitor the health of the Resync Engine in order, for example, to detect a failure at the Resync Engine. If the VM detects a failure at the Resync Engine, the VM may assign another Resync Engine (e.g., at another switch, port, or iPort) to take over the resync operations. In one implementation, the new Resync Engine, once instantiated, may consult the log manager (e.g., metadata) information in order to complete the interrupted resync operations.

According to specific embodiments of the present invention, one or more of the following mirroring operations may be performed when a volume is online.

TABLE 1

| Mirroring Operation | Time Factor |
|---|---|
| Create a write only mirror: | O(1) time |
| Complete a mirror: | O(num_blks) time |
| Break the mirror with logging: | O(1) time |
| Break the mirror without logging: | O(1) time |
| Create a mirror snapshot: | O(1) time |
| Create an addressable mirror: | O(1) time |
| Start the resync logs for a mirror: | O(1) time |
| Recycle the resync logs for a mirror: | O(1) time |
| Perform Fast mirror resync: | O(num_dirty_regions) time |
| Perform full mirror resync: | O(num_blks) time |
| Perform a mirror consistency check: | O(num_bits_in_mrt) time |
| Detach a mirror: | O(1) time |
| Re-attach a mirror: | O(num_dirty_regions) time |
| Delete a mirror: | O(1) time |

As can be seen from Table 1 above, each mirroring operation has an associated time factor which, for example, may correspond to an amount of time needed for performing the associated mirroring operation. For example, the time factor denoted as O(1) represents a time factor which may be expressed as "the order of one" time period, which corresponds to a constant time period (e.g., a fixed number of clock cycles, a fixed number of milliseconds, etc.). Thus, for example, according to a specific embodiment, each of the mirroring operations illustrated in Table 1 which have an associated time factor of O(1) (e.g., create mirror, break mirror, create DS, etc.) may be performed within a fixed or constant time period, independent of factors such as: number of devices (e.g., mirrors, disks, etc.) affected; amount of data stored on the associated mirror(s)/volume(s); etc. On the other hand, other mirroring operations illustrated in Table 1 have associated time factors in which the time needed to perform the operation is dependent upon specified parameters such as, for example: number of dirty regions (num_dirty_regions) to be processed; number of blocks (num_blks) to be processed; etc.

It will be appreciated that the mirroring techniques of the present invention provide a variety of benefits and features which are not provided by conventional mirroring techniques implemented in a storage area network. For example, one feature provided by the mirroring techniques of the present invention is the ability to perform at least a portion of the mirroring operations (such as, for example, those described in Table 1 above) without bringing the volume offline during implementation of such mirroring operations. Thus, for example, while one or more of the mirroring operations (e.g., described in Table 1) are being performed on a specified volume (e.g., volume V1), the affected volume (e.g., V1) will still be online and accessible (e.g., readable and/or writable) to the hosts of the SAN. It will be appreciated that high availability is typically an important factor for Storage Area Networks, and that bringing a volume offline can be very expensive for the customer. However, such actions are unnecessary using the techniques of the present invention.

Another advantage of the present invention is that, in at least one implementation, the affected volume(s) may also be simultaneously instantiated at several different iPorts in the network, thereby allowing several different hosts to access the volume concurrently. Additionally, the mirroring technique of the present invention is able to used in presence of multiple instances of an online volume, without serializing the host accesses to the volume. For example, in at least one implementation, individual iPorts may be provided with functionality for independently performing I/O operations at one or more volumes while mirroring operations are being concurrently being performed using one or more of the volumes. Accordingly, the host I/Os need not be sent to a central entity (such as, for example, one CPP or one DPP) for accessing the volume while the mirroring operation(s) are being performed. This feature provides the additional advantage of enabling increased I/O operations per second since multiple ports or iPorts are able to each perform independent I/O operations simultaneously.

Another difference between the mirroring techniques of the present invention and conventional mirroring techniques is that, in at least one implementation, the technique of the present invention provides a network-based approach for implementing mirroring operations. For example, in one implementation, each of the mirroring operations described herein may be implemented at a switch, port and/or iPort of the FC fabric. In contrast, conventional network storage mirroring techniques are typically implemented as either host-based or storage-based mirroring techniques.

Although the mirroring techniques of the present invention are described with respect to their implementation in storage area networks, it will be appreciated that the various techniques described herein may also be applied to other types of storage networks and/or applications such as, for example, data migration, remote replication, third party copy (xcopy), etc. Additionally, it will be appreciated that the various techniques described herein may also be applied to other types of systems and/or data structures such as, for example, file systems, NAS (network attached storage), etc.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

It is claimed:

1. A method comprising:
    instantiating, by a first switch port of a plurality of ports of a fibre channel fabric associated with a storage area network, a first instance of a first volume for enabling I/O operations to be performed at the first volume;
    creating a differential snapshot of the first volume, the differential snapshot being representative of a copy of the first volume as of a designated time T;
    enabling the first switch port to perform first I/O operations at the first volume concurrently while the differential snapshot is being created;
    instantiating, by a second switch port of the plurality of ports of the fibre channel fabric, a second instance of the first volume for enabling I/O operations to be performed at the first volume; and
    enabling the second switch port to perform second I/O operations to be performed at the first volume concurrently while the differential snapshot is being created, and concurrently while the first switch port is performing the first I/O operations at the first volume;
    wherein the first I/O operations are performed independently of the second I/O operations;
    wherein the first switch port of the plurality of ports is configured to notify the second switch port of the plurality of ports of an active region of the first volume prior to performing a mirror resynchronization operation.

2. The method of claim 1, wherein the first switch port performs first I/O operations concurrently while the differential snapshot of the first volume is created, and wherein the differential snapshot is created concurrently while the first volume is online and accessible to at least one host.

3. A method comprising:
    instantiating, by a first switch port from a plurality of ports of a fibre channel fabric on a storage area network, a first instance of a first volume for enabling I/O operations to be performed at the first volume;
    performing a write operation at the first volume by the first switch port;
    adding or updating an entry in a mirror race table before proceeding with a write operation to a mirror of the first volume, the mirror being implemented as a mirror copy of the first volume, the entry corresponding to a particular region of the mirror;
    performing a first mirroring procedure with respect to the mirror of the first volume, the first mirroring procedure including a write operation to the particular region of the mirror by the first switch port;
    after the write operation to the particular region of the mirror has been performed, updating the entry or deleting the entry from the mirror race table such that the mirror race table indicates that the write operation to the particular region of the mirror is completed, wherein the mirror race table indicates whether the mirror is synchronous;
    enabling the first switch port to perform first I/O operations at the first volume concurrently while the first mirroring procedure is being performed;
    instantiating, at a second switch port from the plurality of ports, a second instance of the first volume for enabling I/O operations to be performed at the first volume;
    enabling the second port to perform second I/O operations to be performed at the first volume concurrently while the first mirroring procedure is being performed and the first port is performing the first I/O operations at the first volume, wherein the first I/O operations are performed independently of the second I/O operations; and
    wherein the first switch port is configured to notify the second switch port of an active region of the first volume prior to performing a mirror resynchronization operation.

4. The method of claim 3, wherein the first mirroring procedure comprises at least one of creating a mirror copy, completing a mirror copy, detaching a mirror copy, re-attaching a mirror copy, or creating a differential snapshot of a designated volume.

5. The method of claim 4 further comprising:
    instantiating the mirror as an addressable second volume, which is separately addressable from the first volume.

6. The method of claim 5 further comprising:
    enabling I/O operations to be performed at the second volume without serializing access to the second volume.

7. The method of claim 4 further comprising:
    instantiating the mirror as an independently addressable second volume; and
    enabling host I/O operations to be performed at the second volume concurrently while the mirror is being populated with data.

8. The method of claim 4 further comprising:
    enabling the first port to perform mirror I/O operations at the mirror concurrently while the first mirroring procedure is being performed.

9. The method of claim 4 further comprising:
    creating the mirror concurrently while the first volume is online and accessible by at least one host; and instantiating the mirror as an addressable second volume, which is separately addressable from the first volume.

10. The method of claim 4 further comprising:
enabling I/O operations to be performed at the first volume without serializing access to the first volume.

11. The method of claim 3, further comprising:
performing a mirror resynchronization operation for the mirror using a MUD log such that information indicating data written to the mirror during the mirror resynchronization operation is recorded in the MUD log.

12. The method of claim 3, further comprising:
ascertaining from the mirror race table that the mirror is synchronous prior to performing a read operation from the mirror.

13. The method of claim 3, wherein the mirror race table includes entries for two or more mirrors corresponding to the first volume, the two or more mirrors including the mirror.

14. The method of claim 3, wherein adding or updating an entry in a mirror race table, performing a first mirroring procedure, and updating the entry or deleting the entry from the mirror race are performed by the first one of the plurality of ports.

15. A network device comprising:
a processor;
an interface operable to provide a communication link to at least one other network device in the data network; and
a non-transitory computer-readable storage medium having stored therein instructions which, when executed by the processor, cause the processor to perform operations comprising:
identifying, by an intelligent port of a plurality of ports in a fibre channel fabric associated with a storage area network, a first one of the plurality of ports of the fibre channel fabric, the first one of the plurality of ports servicing a first volume such that I/O operations at the first volume are supported by the first one of the plurality of ports;
identifying, by the intelligent port of the plurality of ports, a second one of the plurality of ports of the fibre channel fabric, the second one of the plurality of ports servicing the first volume such that I/O operations at the first volume are supported by the second one of the plurality of ports;
notifying, by the intelligent port of the plurality of ports, the first one of the plurality of ports and the second one of the plurality of ports of an active region of the first volume, wherein the active region of the first volume is not accessible to the first one of the plurality of ports and the second one of the plurality of ports during a mirroring operation; and
receiving a mirror resynchronization request pertaining to the first volume, the mirror synchronization request identifying a particular region of the first volume that is to be resynchronized, wherein the active region of the first volume is the particular region of the first volume, and wherein the first one of the plurality of ports is configured to notify the second one of the plurality of ports of the active region of the first volume prior to performing a mirror resynchronization operation.

16. The network device of claim 15, wherein the current active region is a portion of the first volume that is undergoing mirroring operations with respect to one or more mirrors.

17. The network device of claim 15, the network device being further operable to:
apply a MUD log to identify a region of a mirror, the mirror corresponding to the first volume;
resynchronize the region of the mirror.

18. The network device of claim 17, wherein the region is the current active region;
wherein notifying is performed after applying the MUD log and before resynchronizing the region of the mirror.

19. The network device of claim 17, wherein the MUD log is associated with the mirror.

20. The network device of claim 17, wherein data in the identified region does not match data for the identified region that is stored in the first volume.

21. The network device of claim 15, wherein the I/O operations comprise at least one of a read operation, a write operation, or a mirroring operation, and wherein the intelligent port comprises a port having dedicated logic for handling virtualization functions.

22. A network device comprising:
at least one processor;
an interface operable to provide a communication link to at least one other network device in the data network; and
a non-transitory computer-readable storage medium having stored therein instructions which, when executed by the processor, cause the processor to perform operations comprising:
performing a write operation at a first volume by a first one of a plurality of ports of a fibre channel fabric associated with a storage area network;
adding or updating an entry in a mirror race table before proceeding with a write operation to a mirror of the first volume, the mirror being implemented as a mirror copy of the first volume, the entry corresponding to a particular region of the mirror;
performing a first mirroring procedure with respect to the mirror of the first volume, the first mirroring procedure including a write operation to the particular region of the mirror by the first port;
after the write operation to the particular region of the mirror has been performed, updating the entry or deleting the entry from the mirror race table such that the mirror race table indicates that the write operation to the particular region of the mirror is completed;
ascertaining from the mirror race table that the mirror is synchronous prior to performing a read operation from the mirror;
updating a second entry in the mirror race table before proceeding with a write operation to a second mirror, the second entry corresponding to a particular region of the second mirror;
performing a write operation to the particular region of the second mirror by the first port;
after the write operation to the particular region of the second mirror, updating the second entry or deleting the second entry from the mirror race table such that the mirror race table indicates that the write operation to the particular region of the second mirror is complete; and
wherein the first port is configured to notify a second one of the plurality of ports of an active region of the first volume prior to performing a mirror resynchronization operation.

23. The network device of claim 22, wherein the mirror race table includes entries for two or more mirrors corresponding to the first volume, the two or more mirrors including the mirror.

24. The network device of claim 22, the network device being operable to:
comparing respective values of the entry and the second entry to identify a data inconsistency between the first mirror and the second mirror, and wherein the mirror race table is stored in a persistent storage accessible to one or more ports associated with the storage area network.

25. The network device of claim 22, wherein the first volume has two or more mirrors associated therewith, wherein the two or more mirrors include the mirror and a second mirror, and wherein access to the second mirror is allowed during the mirroring operation.

26. The network device of claim 22, wherein adding or updating an entry in a mirror race table, performing a first mirroring procedure, updating the entry or deleting the entry from the mirror race table, and ascertaining from the mirror race table that the mirror is synchronous are performed by the first one of the plurality of ports.

27. A method comprising:
identifying, by an intelligent port of a plurality of ports in a fibre channel fabric associated with a storage area network, a first one of the plurality of ports of the fibre channel fabric, the first one of the plurality of ports servicing a first volume such that I/O operations at the first volume are supported by the first one of the plurality of ports;
identifying, by the intelligent port of the plurality of ports, a second one of the plurality of ports of the fibre channel fabric, the second one of the plurality of ports servicing the first volume such that I/O operations at the first volume are supported by the second one of the plurality of ports;
notifying, by the intelligent port of the plurality of ports, the first one of the plurality of ports and the second one of the plurality of ports of a current active region of the first volume, wherein the current active region of the first volume is not accessible to the first one of the plurality of ports and the second one of the plurality of ports during a mirroring operation; and
receiving a mirror resynchronization request pertaining to the first volume, the mirror synchronization request identifying a particular region of the first volume that is to be resynchronized, wherein the active region of the first volume is the particular region of the first volume, and wherein the first one of the plurality of ports is configured to notify the second one of the plurality of ports of the active region of the first volume prior to performing a mirror resynchronization operation.

28. The method of claim 27, wherein the current active region is a portion of the first volume that is undergoing mirroring operations with respect to one or more mirrors.

29. The method of claim 27, further comprising:
applying a MUD log to identify a region of a mirror, the mirror corresponding to the first volume; and
resynchronizing the region of the mirror.

30. The method of claim 29, wherein the region is the current active region;
wherein notifying is performed after applying the MUD log and before resynchronizing the region of the mirror.

31. The method of claim 29, wherein the MUD log is associated with the mirror.

32. The method of claim 29, wherein data in the identified region does not match data for the identified region that is stored in the first volume.

33. The method of claim 29, wherein notifying comprises updating metadata accessible by the first one of the plurality of ports and the second one of the plurality of ports.

* * * * *